United States Patent [19]
Andrews et al.

[11] Patent Number: 5,848,143
[45] Date of Patent: *Dec. 8, 1998

[54] COMMUNICATIONS SYSTEM USING A CENTRAL CONTROLLER TO CONTROL AT LEAST ONE NETWORK AND AGENT SYSTEM

[75] Inventors: G. Wayne Andrews, Amherst, N.H.; Steven H. Webber, Groton, Mass.; James P. Kelly, West Newbury, Mass.; Lawrence E. Johnson; Jerry A. Stern, both of Sudbury, Mass.; Vincent J. Milano, Jr., Westwood, Mass.; Charles R. Davis, Stow, Mass.

[73] Assignee: Geotel Communications Corp., Littleton, Mass.

[*] Notice: The term of this patent shall not extend beyond the expiration date of Pat. No. 5,546,452.

[21] Appl. No.: 718,491
[22] PCT Filed: Mar. 4, 1996
[86] PCT No.: PCT/US96/02890
    § 371 Date: Nov. 5, 1996
    § 102(e) Date: Nov. 5, 1996
[87] PCT Pub. No.: WO96/27254
    PCT Pub. Date: Sep. 6, 1996

Related U.S. Application Data

[63] Continuation-in-part of Ser. No. 398,950, Mar. 2, 1995, Pat. No. 5,546,452.
[51] Int. Cl.[6] .................................................. H04M 7/06
[52] U.S. Cl. ........................ 379/219; 379/198; 379/207; 379/229; 379/265; 370/270; 370/352
[58] Field of Search .................................... 379/219, 220, 379/221, 265, 266, 309, 207, 201, 202, 198, 67, 88, 89, 229, 100.08, 100.05, 100.16; 370/351, 352, 270

[56] References Cited

U.S. PATENT DOCUMENTS

| | | | |
|---|---|---|---|
| 4,161,718 | 7/1979 | Cohen et al. | 340/146 |
| 4,191,860 | 3/1980 | Weber | 379/115 |
| 4,348,554 | 9/1982 | Asmuth | 379/113 |

(List continued on next page.)

FOREIGN PATENT DOCUMENTS

| | | | |
|---|---|---|---|
| 0342295 | 11/1989 | European Pat. Off. | H04M 11/00 |
| 0568114 | 11/1993 | European Pat. Off. | H04M 3/50 |
| 0620669 | 10/1994 | European Pat. Off. | H04M 3/46 |
| WO/92/09164 | 5/1992 | WIPO | H04M 3/00 |

OTHER PUBLICATIONS

Gechter et al, ISDN Service Opportunities in the Intelligent Network, Proceedings of the International Communications Forum, vol. 43, No. 1, 2–4 Oct. 1989 pp. 548–551.

Lenihan, Impact of Customer Demand on Digital Switching Business Services—ACDs, Annual Review of Communications, vol. 46, 1992–1993, pp. 590–598.

Gawrys et al, ISDN: Integrated Network/Premises Solutions for Customer Needs, IEEE International Conference on Communications, 1986—Session 1.1., vol. 1, Jun. 22–25, 1996, pp. 1.1.1.–1.1.5.

(List continued on next page.)

Primary Examiner—Scott Wolinsky
Attorney, Agent, or Firm—Hayes, Soloway, Hennessey, Grossman & Hage, P.C.

[57] ABSTRACT

A communications system and method for automatically making telephone routing decisions with "global authority" based upon information gathered in real time from the entire communications system and global optimization criteria. The present invention permits unified central control and management for the entire system.

51 Claims, 16 Drawing Sheets

U.S. PATENT DOCUMENTS

| | | | |
|---|---|---|---|
| 4,400,587 | 8/1983 | Taylor et al. | 179/27 |
| 4,653,085 | 3/1987 | Chan et al. | 379/93.14 |
| 4,696,028 | 9/1987 | Morganstein et al. | 379/88 |
| 4,750,110 | 6/1988 | Mothersole et al. | 364/200 |
| 4,750,112 | 6/1988 | Jones et al. | 364/200 |
| 4,750,113 | 6/1988 | Buggert | 364/200 |
| 4,750,114 | 6/1988 | Hirtle | 364/200 |
| 4,750,116 | 6/1988 | Pham et al. | 364/200 |
| 4,757,267 | 7/1988 | Riskin | 379/113 |
| 4,757,526 | 7/1988 | Foster et al. | 379/201 |
| 4,763,353 | 8/1988 | Canale et al. | 379/157 |
| 4,788,718 | 11/1988 | McNabb et al. | 379/113 |
| 4,837,799 | 6/1989 | Prohs et al. | 379/224 |
| 4,896,350 | 1/1990 | Bicknell et al. | 379/220 |
| 4,930,150 | 5/1990 | Katz | 379/93 |
| 4,930,151 | 5/1990 | Walton et al. | 379/94 |
| 4,932,046 | 6/1990 | Katz et al. | 379/32 |
| 4,932,048 | 6/1990 | Kenmochi et al. | 379/67 |
| 4,939,773 | 7/1990 | Katz | 379/204 |
| 4,939,774 | 7/1990 | Sawada | 379/353 |
| 4,987,590 | 1/1991 | Katz | 379/204 |
| 5,012,511 | 4/1991 | Hanle et al. | 379/211 |
| 5,014,297 | 5/1991 | Morita et al. | 379/82 |
| 5,014,298 | 5/1991 | Katz | 379/93 |
| 5,016,270 | 5/1991 | Katz | 379/92 |
| 5,036,535 | 7/1991 | Gechter et al. | 379/210 |
| 5,048,075 | 9/1991 | Katz | 379/92 |
| 5,048,076 | 9/1991 | Maurer et al. | 379/94 |
| 5,062,103 | 10/1991 | Davidson et al. | 370/58.1 |
| 5,073,890 | 12/1991 | Danielsen | 370/270 |
| 5,073,929 | 12/1991 | Katz | 379/93 |
| 5,091,933 | 2/1992 | Katz | 379/204 |
| 5,109,403 | 4/1992 | Sutphin | 379/59 |
| 5,109,404 | 4/1992 | Katz et al. | 379/88 |
| 5,109,405 | 4/1992 | Morganstein | 379/89 |
| 5,109,406 | 4/1992 | Mano et al. | 379/94 |
| 5,128,984 | 7/1992 | Katz | 379/92 |
| 5,128,985 | 7/1992 | Yoshida et al. | 379/100 |
| 5,164,983 | 11/1992 | Brown et al. | 379/265 |
| 5,168,515 | 12/1992 | Gechter et al. | 379/265 |
| 5,181,237 | 1/1993 | Dowden et al. | 379/88 |
| 5,181,239 | 1/1993 | Jolissaint | 379/96 |
| 5,184,348 | 2/1993 | Abdelmouttalibetal | 370/95 |
| 5,185,780 | 2/1993 | Leggett | 379/34 |
| 5,185,781 | 2/1993 | Dowden et al. | 379/67 |
| 5,185,782 | 2/1993 | Srinivasan | 379/67 |
| 5,185,783 | 2/1993 | Takahashi et al. | 379/93 |
| 5,185,785 | 2/1993 | Funk et al. | 379/111 |
| 5,185,786 | 2/1993 | Zwick | 379/201 |
| 5,185,787 | 2/1993 | Katz | 379/204 |
| 5,187,734 | 2/1993 | Takahashi et al. | 379/79 |
| 5,187,735 | 2/1993 | Herrero Garcia et al. | 379/88 |
| 5,189,694 | 2/1993 | Garland | 379/106 |
| 5,189,695 | 2/1993 | Maci | 379/93 |
| 5,195,090 | 3/1993 | Bolliger et al. | 370/94 |
| 5,195,091 | 3/1993 | Farwell et al. | 370/94 |
| 5,206,899 | 4/1993 | Gupta et al. | 379/120 |
| 5,206,900 | 4/1993 | Callele | 379/142 |
| 5,206,903 | 4/1993 | Kohler et al. | 379/309 |
| 5,208,848 | 5/1993 | Pula | 379/67 |
| 5,208,849 | 5/1993 | Fu | 379/70 |
| 5,218,631 | 6/1993 | Katz | 379/88 |
| 5,218,632 | 6/1993 | Cool | 379/126 |
| 5,218,633 | 6/1993 | Clagett et al. | 379/144 |
| 5,222,061 | 6/1993 | Doshi et al. | 370/13 |
| 5,222,123 | 6/1993 | Brown et al. | 379/57 |
| 5,222,124 | 6/1993 | Castaneda et al. | 379/67 |
| 5,224,153 | 6/1993 | Katz | 379/93 |
| 5,225,309 | 7/1993 | Katz | 379/88 |
| 5,225,315 | 7/1993 | Bushnell | 379/221 |
| 5,226,075 | 7/1993 | Funk et al. | 379/243 |
| 5,237,604 | 8/1993 | Ryan | 379/220 |
| 5,237,605 | 8/1993 | Peak et al. | 379/399 |
| 5,243,642 | 9/1993 | Wise, Jr. et al. | 379/82 |
| 5,243,643 | 9/1993 | Satter et al. | 379/88 |
| 5,243,644 | 9/1993 | Garland et al. | 379/106 |
| 5,243,645 | 9/1993 | Bissell et al. | 379/211 |
| 5,249,221 | 9/1993 | Ketring | 379/214 |
| 5,249,222 | 9/1993 | Pinard | 379/220 |
| 5,249,223 | 9/1993 | Vanacore | 379/221 |
| 5,251,252 | 10/1993 | Katz | 379/92 |
| 5,259,023 | 11/1993 | Katz | 379/88 |
| 5,259,024 | 11/1993 | Morley, Jr. et al. | 379/88 |
| 5,265,150 | 11/1993 | Helmkamp et al. | 379/58 |
| 5,265,248 | 11/1993 | Moulios et al. | 395/650 |
| 5,271,058 | 12/1993 | Andrews et al. | 379/210 |
| 5,278,891 | 1/1994 | Bhagat et al. | 379/58 |
| 5,278,892 | 1/1994 | Bolliger et al. | 379/60 |
| 5,278,894 | 1/1994 | Shaw | 379/67 |
| 5,282,243 | 1/1994 | Dabbaghi et al. | 379/201 |
| 5,282,244 | 1/1994 | Fuller et al. | 379/230 |
| 5,287,103 | 2/1994 | Kasprzyk et al. | 340/825 |
| 5,291,480 | 3/1994 | Nimon | 379/58 |
| 5,291,481 | 3/1994 | Doshi et al. | 370/60 |
| 5,291,490 | 3/1994 | Conti et al. | 370/85 |
| 5,291,550 | 3/1994 | Levy et al. | 379/242 |
| 5,291,552 | 3/1994 | Kerrigan et al. | 379/266 |
| 5,297,189 | 3/1994 | Chabernaud | 379/58 |
| 5,297,197 | 3/1994 | Katz | 379/204 |
| 5,299,258 | 3/1994 | Tsumura et al. | 379/112 |
| 5,299,259 | 3/1994 | Otto | 379/221 |
| 5,299,260 | 3/1994 | Shaio | 379/265 |
| 5,305,308 | 4/1994 | English et al. | 370/32 |
| 5,309,505 | 5/1994 | Szlam et al. | 379/265 |
| 5,309,513 | 5/1994 | Rose | 379/265 |
| 5,311,574 | 5/1994 | Livanos | 379/88 |
| 5,311,575 | 5/1994 | Oh | 379/88 |
| 5,317,628 | 5/1994 | Misholi et al. | 379/89 |
| 5,317,629 | 5/1994 | Watanabe | 379/93 |
| 5,317,630 | 5/1994 | Feinberg et al. | 379/94 |
| 5,327,488 | 7/1994 | Garland | 379/201 |
| 5,327,489 | 7/1994 | Anderson et al. | 379/207 |
| 5,327,490 | 7/1994 | Cave | 379/266 |
| 5,329,572 | 7/1994 | Mertens | 348/16 |
| 5,329,573 | 7/1994 | Chang et al. | 379/58 |
| 5,329,583 | 7/1994 | Jurgenson et al. | 379/266 |
| 5,333,133 | 7/1994 | Andrews et al. | 370/61 |
| 5,333,184 | 7/1994 | Doherty et al. | 379/115 |
| 5,333,187 | 7/1994 | Hiraiwa et al. | 379/219 |
| 5,333,188 | 7/1994 | Bogart et al. | 379/220 |
| 5,333,229 | 7/1994 | Sayegh | 385/102 |
| 5,333,308 | 7/1994 | Ananthanpillai | 395/575 |
| 5,335,269 | 8/1994 | Steinlicht | 379/266 |
| 5,341,364 | 8/1994 | Marra et al. | 370/16 |
| 5,349,632 | 9/1994 | Nagashima | 379/61 |
| 5,349,633 | 9/1994 | Katz | 379/88 |
| 5,349,636 | 9/1994 | Irribarren | 379/89 |
| 5,351,285 | 9/1994 | Katz | 379/94 |
| 5,359,645 | 10/1994 | Katz | 379/93 |
| 5,365,575 | 11/1994 | Katz | 379/92 |
| 5,365,576 | 11/1994 | Tsumura et al. | 379/93 |
| 5,365,577 | 11/1994 | Davis et al. | 379/96 |
| 5,412,708 | 5/1995 | Katz | 348/14 |
| 5,416,830 | 5/1995 | MacMillan, Jr. et al. | 379/88 |
| 5,442,688 | 8/1995 | Katz | 379/156 |
| 5,442,689 | 8/1995 | Buttitta et al. | 379/201 |
| 5,442,691 | 8/1995 | Price et al. | 379/220 |
| 5,465,286 | 11/1995 | Clare et al. | 379/34 |
| 5,469,504 | 11/1995 | Blaha | 379/265 |
| 5,497,424 | 3/1996 | Vanderpool | 380/34 |
| 5,499,291 | 3/1996 | Kepley | 379/265 |
| 5,511,112 | 4/1996 | Szlam | 379/265 |

| | | | |
|---|---|---|---|
| 5,519,773 | 5/1996 | Dumas et al. | 379/265 |
| 5,528,678 | 6/1996 | Kaplan | 379/201 |
| 5,530,740 | 6/1996 | Irribarren et al. | 379/100.08 |
| 5,530,744 | 6/1996 | Charalambous et al. | 379/265 |
| 5,537,470 | 7/1996 | Lee | 379/266 |
| 5,537,611 | 7/1996 | Rajagopal et al. | 379/221 |
| 5,546,452 | 8/1996 | Andrews et al. | 379/219 |
| 5,546,456 | 8/1996 | Vilsoet et al. | 379/265 |
| 5,555,297 | 9/1996 | Ochy et al. | 379/136 |
| 5,557,668 | 9/1996 | Brady | 379/212 |
| 5,563,940 | 10/1996 | Tsuzuki et al. | 379/233 |
| 5,568,544 | 10/1996 | Keeler et al. | 379/273 |
| 5,577,105 | 11/1996 | Baum et al. | 379/93 |
| 5,586,177 | 12/1996 | Farris et al. | 379/230 |
| 5,588,037 | 12/1996 | Fuller et al. | 455/31.2 |
| 5,590,181 | 12/1996 | Hogan et al. | 379/114 |
| 5,590,186 | 12/1996 | Liao et al. | 379/210 |
| 5,590,188 | 12/1996 | Crockett | 379/225 |
| 5,592,473 | 1/1997 | Matern et al. | 370/264 |
| 5,592,477 | 1/1997 | Farris et al. | 370/396 |
| 5,608,786 | 3/1997 | Gordon | 379/100.16 |
| 5,610,970 | 3/1997 | Fuller et al. | 455/417 |
| 5,619,557 | 4/1997 | Van Berkum | 379/201 |
| 5,696,809 | 12/1997 | Voit | 379/265 |

OTHER PUBLICATIONS

"Plaintiff Geotel's Responses to Defendent Genesys' First Set Of Requests for Addmissions to Plaintiff Geotel"; Nov. 7, 1997; pp. 1–5.

"Defendent Genesys's Reply to Plaintiff's Supplemental Memorandum in Opposition for Genesys's Motion for Partition of Discovery and Trail on Liability Issues"; Dec. 1, 1997; pp. 1–4.

"Plaintiff's Memorandum in Opposition to Defendent's Motion for Leave to File a ReplyMemorandum to Geotel's Supplemental Memorandum in Opposition to Motion for Partition of Discovery and Trial on Liability isssues"; Dec. 5, 1997; pp. 1–3.

"Joint Motion to Modify Scheduling Order"; Dec. 19, 1997; pp. 1–3.

"Affidavit of Michael B. Dobbins"; Nov. 18, 1997; pp. 1–14. With Attachments.

"Affidavit of G. Wayne Andrews"; Nov. 18, 1997; pp. 1–4 with Attachments.

"Plaintiff Geotel's Supplemental Memorandum in Opposition to Defendant Genesys' Motion to Partition Discovery and Trial"; Nov. 18, 1997; pp.1–6.

"Defendant Genesys' Motion for Leave to File a Reply to Geotel's Supplemental Memorandum in Opposition to Genesys' Motion for Partition of Discovery and Trial on Liability Issues"; Dec. 1, 1997; pp.1–2.

"Defendant Genesys' Supplemental Memorandum in Support of Its Motion To PartitionDiscovery and Trial"; Oct. 29, 1997; pp.1–3. with attachments (Affidavit of Anthony S. Acampora;Exhibits A–M).

"Information Disclosure Statement"; Gechter et al.; U.S. Patent No. 5036535;(File Wrapper) May 20, 1997; Boston Globe; Geotel Communications 1pg.

Geotel Communications; "Intelligent Call Rouetr"; Mar. 1997 pp.1–10.; Geotel Communications.

PC Week, By Stan Gibson; "Geotel package distributes calls"; Aug. 1994; 1pg.; Goetel Cummunications.

Telemarketing Call Center; Apr. 1996.

Call Center Magazine; "Call Centers On The Move"; Apr. 1996; 1pg.

Lan Magazine; "First Call Resolution Call Rate Improved By 400%"; Feb. 1997; 1pg.; Molloy Group.

Call Center Magazine; "Total Net"; Feb. 1997; 1pg.

Call Center Magazine; Feb. 1997; "Executone"; 1Pg.

Call Center; Feb. 1997, 1pg. "Yes! We Got the Knowledge–Paks, Too!"; Service Warehouse, Inc.

Network World; Aug. 1994; "New sortware cac route calls among multivendor ACDs" pp. 1–2.

Latest Call Center Products, "Management"; pp. 1–2; Nov. 13, 1995.

Call Center Magazine; "7 Reasons to Locate your European Call Center In Belgium"; Sep. 1996; 1 pg.; Belgacom.

Call Center Magazine; Oct. 1996; 1 pg.; "Arm yourself" Intervoice.

Network News; "Virtuial Call Center"; Oct. 1996; 1 pg.; Network News.

Optus Relay; 1996, 2 pg.; "Geotel Manages Multiple Call Centers as a Single Resource".

Call Centers Magazine; Nov. 1995;pp. 1–4; "USAir Uses IN Technology for Call centers"; Business Communications.

Call Center Magazine; Dec. 1995; 1 pg.; "When the sophisticated is made simple, experts Call it Elegant So will you" Sep. 1996;1 pg..

Interactive Voice Responce; Nov. 1996; "Thank you for waiting. How may I help you?";pp. 1–3; AT&T.

Call Center Technology; "Finally, Computers and Telephones are thinking along the same lines"; Apr. 1996; Comdial; 2pgs.

Teleconnect; Apr. 1996; "ACDs & Call Sequencers"; pp. 1–3.; Teleconnect.

Genesys; "Genesys T–Server"; Brochure; Gate unknown, publication unknown.

Naimi; "Prestige International activates information network"; Mar. 1993; pp. 56–57; Voice Processing Magazine.

Doren; "Empowering the Call Center"; Oct. 1993; pp.10–19; The Power of Integration B C R.

"Prestigious Worldwide Service—at Half the Cost"; Mar. 1994; pp. 12–13; TeleProfessional.

Naimi; "Prestige International Activates Information Network"; pp. 56–57; publication unknown, date unknown.

Shillingford; "Computer–telephony helps travel company provide Prestige service"; Feb. 2, 1995; pp. 8–9; FT Business Computing Brief.

Lipner; "Bridging The Gap"; Jan. 1993; pp. 106–110; Northwest Airlines World Traveler.

PBX; May 1993; entire magazine..pp.1–32; BCR Enterprises, Inc.

Author unknown; "VISA IARS Pilot High Level System Architecture"; Sep. 23, 1994; p. 6; Commercial in Confidence, Issue 3.

Microvoice; "Apex Fact Sheet–I.Q.—Intelligent Queuing Feature"; 1986–87; pp. 95–101; Microvoice.

Aspect Telecommunications Corp.; "Aspect CallCenter"; 1988; pp. 81–96; Aspect Telecommunications Corporation.

Zeuch; "(Draft) American National Standard for Telecommunications–Call Transfer Service"; 1988; American National Standard.

Genesys Labs; "Genesys' Call Center Manager"; Sep. 1995; Call Center Magazine.

Geros; "Star of the Industry"; Sep. 1995; Computer Telephony.

Galvin; "Genesys Telecommunciations Netvectoring Unites Internet, Advanced Callcenter capabilities, and Two–Way Realtime Video Conferencing"; Dec. 5, 1995; Genesys Labs.

Galvin; "Genesys Telecommunications Laboratories and Bruncor, Inc. announce Joint Venture–Genesys Laboratories Canada, Inc."; Feb. 9, 1996; Genesys Telecommunications Laboratories.

Rudd et al; "Here Comes the Virtual Public Netowrk—Will Competition spark even more flexible and innovative Intelligent Netowrk–based services?"; Nov. 1995;Business Communications Review.

"Geotel's Network Routing"; p. 84; Nov. 1995; Call Center Magazine.

"Making your Center More Manageable"; Oct. 1995; pp. 90, 92 Call Center Magazine.

Barry; "Venture capital funding slows"; Nov. 10–16, 1995; pp.1, 37; Boston Business Journal, vol. 15, No. 39.

"USAir Uses In Technology for Call Centers"; Nov. 1995; p. 53; Business Communications Review.

"Mixes, Marriages, and Mergers . . . "; Jan. 1996; p. 90; TeleProfessional.

Rohde; "New Software can route calls amoung multivendor ACDs"; Aug., 1994; Network World, vol. 11, No. 34.

"Extending Their Reach"; Dec. 1995; pp. 62–64, 66; Call Center Magazine.

"Geotel/Call Center Enterprises Partnership"; Jan. 1996; Telemarketing & Call Center Solutions.

"Fujitsu's New ATM Switches"; Dec. 1995; p. 23; Teleconnect.

"Geotel's Intelligent Callrouter"; Dec. 1995; p.24; Teleconnect.

"Geotel's Intelligent CallRouter"; Feb. 1996; p. 71; Call Center Magazine.

"Computer Telephony show roundup–Module lets users check messages from the Web"; Mar. 25, 1996; PC Week.

Lenz; "Small ACDs that fill Tall Orders"; Apr. 1996; pp.67–68; Call Center Magazine.

Advertisement; "Looking for Flexibility in Your Call Center Software?"; Apr. 1996; p. 43; TeleProfessional.

Advertisement; "1996 Call Center Showcase Tour"; Apr. 1996; p. 41; TeleProfessional.

Dworman; "Informercials Offer a Tremendous Opportunity for Telemarketers"; Apr. 1996; p. 26; Telemarketing & Call Center Solutions.

Lenz; "On the Move"; May 1996; p. 57; Call Center Magazine.

"Geotel Wins $5 Million Optus Contract"; Jun. 1996; p. 110; Telemarketing & Call Center Solutions.

Gerber; "Smart Routes"; Jun. 1996; pp. T3 and T8; Computerworld Telecom Journal.

Roger Rebber; "Why You Should Use IVR"; Nov. 1996; Call Center Magazine; pp.48, 49, 51, 54, 56.

Hewitt; "Affordable Intelligence"; May 27, 1996–Jun. 9, 1996, Worchester Business Journal.

McNaughton; "Fixing the Pipes—Investors Throw Money at the Bandwidth Problem"; Oct. 1996; pp.3, 38, 40, 41, 49.

Upside Fried; "The Unexpected Benefits of Cliant/Server"; Oct. 1996; pp. 87 and 89; Telemarketing & CCS.

"IVR Interface"; Oct. 1996; p. 136; Telemarketing & Call Center Solutions.

Currey; "Reservations gets an Upgrade"; Dec. 1996; p. 62; Profiles.

M. Bodin; "New Options for Improved control of your Center"; Feb. 1997; pp. 76, 78, 80; Call Center Magazine.

Dawson, K.; "Welcome to the Virtual Call Center"; Feb. 1997; pp. 36,38; Call Center Magazine.

META Group; "Global Networking Stategies"; Apr. 29, 1996; META Group, Inc.

Gechter; "Enterprise Skills Routing: A Better Solution for Today's Call Center"; Feb. 1997; p. 28 to end of article; Telemarketing & Call Center Solutions.

"Focus On: The Latest Trends In Inbound Call Center Technology"; April 1996; pp. 20–25; Telemaketing & Call Center Solutions.

Geotel Communication; "Intelligent CallRouter"; 1997; Geotel Communications Corporation.

Kelly, P.; "Why Integrate IVRs Into an Overall Call CEnter Systems Solution?"; Apr. 1997; pp. 56, 58 and 60; Teleprofessional.

Geotel; "IVR Interface"; Mar. 1997; p. 63; Communications News.

"Call distribution Product"; Mar. 1997; p.124; Telemarketing & Call Center Solutions.

Gechter; "Enterprise Skills Routing At Work"; Feb. 1997; p.137; Telemarketing & Call Center Solutions.

"British Telecommunications plc"; Feb. 1, 1997; Network World.

"ACD Advances"; Sep. 1995; Teleconnect.

"GeoTel's Intelligent CallRouter"; Feb. 1996; Call Center Magazine.

"Smart Multi–Site Call Routing"; Sep. 1994; p. 83; Call Center Magazine.

Angus; "GeoTel CallRouter Promises Large Distributed Call Centers"; 1994; pp. 9–11; Angus TeleManagement Group, Inc.

Gibson; "GeoTel package distributes calls"; Aug. 1994; PC Week vol. 11, No. 77.

"Davox/GeoTel Establish Alliance"; Feb. 1996; Telemarketing & Call Center Solutions.

Jainschigg; "Everybody needs a call center!"; Apr. 1996; pp. 105 and 108; Teleconnect.

Meade; "Partnership to Enable 'Virtual' Operations"; Apr. 1, 1996; pp. 38, 39 and 41; America's Network.

Volpe, L.; "Taking control of the Network"; Apr. 1996;pp.40, 42 44, 46; TeleProfessional.

Focus On: The Latest Trends In Inbound Call Center Technology; Apr. 1996; pp.20, 22, 24–25; Telemarketing & Call Center Solutions.

"Network ACDs"; May 1996;p.87; Call Center Magazine.

Media Release; Optus Communications; "Optus Heeds Call for Call Centers"; Apr. 29, 1996; Optus Communications.

Apostolou, N.; "Optus and GeoTel in call router agreement"; Apr. 11, 1996; p. 1; Communications Day, Issue No. 96–377.

Kelly; "CTI—Re–Engineering Enterprise Call Centers"; Jul. 1996; pp. 50, 52, 54; Telemarketing & Call Center Solutions.

McCloy; "Geotel makes the right call"; Jul. 12–18, 1996; on–line, 1996/97 Doing Business in Boston –Circuit Breakers.

Fitzgerald; "Geotel makes the right call"; Jul. 12–18, 1996; Boston Business Journal.

Scovotti; "Mergers and Alliances Dominate the Market"; Jun. 1996; p.79; TeleProfessional.

Kelley; "Call center Transformation: The Integration of the Desktop"; Oct. 1996; p. 84 and second page unknown; Telemarketing & Call Center Solutions.

Goehring; "Intelligent call centers take off"; Oct. 1996; p.19; Communications News.

Krapf; "Can Network–based Services Unite Distributed Call Centers?"; Nov. 1996; pp.42–46;; Business Communications Review.

"From the ACD Makers"; p. 82; Feb. 1997; Call Center Magazine.

Meta Group; "Call Center Treasure Island—Who has the Map?"; 1996; Apr. 29, 1996; META Group, Inc.

Pieretti; EIS International and GeoTel Announce Strategic Alliance to Develop Syngergistic Marketing and Technical Development Opportunities; Jan. 6, 1997; EIS International, Inc.

Melita International; "Melita and GeoTel Join Forces to Integrate Imbound and Outbound Applications Across Multiple Call Centers"; Jan. 1997; Melita International—Press Release.

"GeoTel Communications granted patent for intelligent call routing technology"; Dec. 17, 1996; Business Wire.

GeoTel Commun Gets Patent for Call Routing System Tech; Dec. 17, 1996; Dow Jones and Company, Inc. (combined).

"GeoTel–Boosting Capabilities for Distributed Call Centers"; Aug. 1994; pp.59–61; Business Communications Review.

Semilof; "App routes calls to remote sites"; Aug. 29, 1994; Communications Week.

Stahl; "Creating 'Virtual' Call Centers"; Sep. 5, 1994; Information Week.

Mitra; "Jump–starting Services on the Advanced Intelligent Network"; Feb. 26, 1996; Telephony.

Llana; "Integrating the Advanced intelligent Network"; Feb. 1996; Telecommunications.

Geotel Communications; "GeoTel Communications Granted patent for Intelligent Call Routing Technology"; Dec. 17, 1996; Geotel Communications Corp.—Press Release.

Geotel Communications; "GeoTel Communications Corporation Announces Support for the Rockwell Spectrum ACD—Version 4.0"; Oct. 8, 1996; Geotel Communications Corporation—Press Release.

Oct. 8, 1996; Business Wire Business Wire; "Geotel Communications announces support for the Rockwell Spectrum 4.0; Continental Airlines to use Geotel Software with Rockwell Spectrum in its enterprise call centers".

Geotel Communications; "GeoTel Communications & InterVoice Announce New Product Interoperability"; Aug. 27, 1996; Geotel Communications Corporation—Press Release.

Geotel Communications; "Geotel Communications Adds Interactive Voice Response Interface to Intelligent CallRouter"; Aug. 27, 1996; Geotel Communications Corporation—Press Release.

Geotel Communications; "GeoTel Communications Corporation and MCI Sign Multi–Year, Multi–Million Dollar Contract for Intelligent Call Routing Software"; Jul. 9, 1996; Geotel Communications Corp–Press Release.

Geotel Communications; "GeoTel Communications Corporation Announces Management Appointments"; Jun. 18, 1996; Geotel Communications Corp–Press Release.

Geotel Communications; "GeoTel Communications Corporation & Optus Communications Announce $5 Million Contract"; Apr. 9, 1996; Geotel Communications—Press Release.

Geotel Communications; "GeoTel to Showcase Intelligent CallRouter's New Breakthrough Routing & Reporting Capabilities at Computer Telephony Expo '96"; Mar. 12, 1996; Geotel Communications—Press Release.

Geotel Communications; "Intelligent CallRouter Version 1.3 from Geotel Communications Corporation Adds Advanced Features"; Feb. 6, 1996; Geotel Communications Corporation—Press Release.

Geotel Communications; "New Geotel—Davox Strategic Partnership Creates Virtual CAll Center"; Jan. 17, 1996; Geotel Communications Corporation—Press Release.

Geotel Communications; Intelligent CallRouter Softwar3e from Geotel Communications Corporation Passes Stringent Interface Requirements of AT&T, MCI and Sprint; Dec. 12, 1995; Geotel Communications Corp.–Press Release.

Geotel Communications; "Geotel Communications Corporation and Call Center Enterprises Establish Alliance"; Nov. 28, 1995; Geotel Communications Corporation—Press Release.

Geotel Communications; TCS and GeoTel Establish Market and Technology Alliance; Aug. 28, 1995; Geotel Communications Corporation—Press Release.

Geotel Communications; "Fidelity Capital Acquires 10 Percent Ownership in GeoTel"; Aug. 28, 1995; Geotel Communications Corporation–Press Release.

Geotel Communications; "Geotel Broadens Its Family of Intelligent CallRouter Software and Announces General Availability"; Jun. 7, 1995; Geotel Communications Corporation—Press Release.

Geotel Communications; "Geotel Announces AT&T ICP Network Compliance"; Feb. 6, 1995; Geotel Communications Corporation—Press Release.

Geotel Communications; "GeoTel's Intelligent CallRouter Enters Beta"; Feb. 6, 1995; Geotel Communications Corporation—Press Release.

Geotel Communications;"GeoTel Expands Field Sales and Support Organization"; Feb. 6, 1995; Geotel Communications Corporation—Press Release.

Geotel Communications; "GeoTel and Aspect Form Application Partnership"; Nov. 7, 1994; Geotel Communications Corporation—Press Release.

Geotel Communications; "GeoTel Announces Strategic Relationship with Rockwell"; Oct. 31, 1994; Geotel Communications Corporation—Press Release.

Geotel Communications; "New Company—GeoTel Communications Corporation, Will Provide Network Routing Software for Call Centers"; Aug. 22, 1994; Geotel Communications Corporation—Press Release.

Geotel Communications; "Geotel Communications Corpration Introduces Network Intelligent CallRouter"; Jan. 15, 1997; Geotel Communications Corporation—Press Release.

Geotel Communications; "USAir Recognized as a Call Center of the Year"; Feb. 3, 1997; Geotel Communications Corporation—Press Release.

Geotel Communications; "GeoTel to Showcase Virtual Call Center Capabilities at Computer Telephony Expo '97"; Mar. 4, 1997; Geotel Communications Corporation—Press Release.

Hewlett Packard; "HP and GeoTel to Offer Virtual Call–Center Solutions Through Worldwide Agreement"; Aug. 18, 1997; Hewlett Packard.

Business Wire; "Call–Center Solutions through Worldwide Agreement; Networked Call Routing and Integration of Multiple Contact Channels Deliver Powerful Customer–Management Capabilities"; Aug. 18, 1997; Bloomberg.

Geotel Communications; "GeoTel and AT&T Announce Co–Marketing Agreement"; Feb. 11, 1997; Geotel Communications Corporation—Press Release.

Geotel Communications; "British Telecommunications Adopts GeoTel Technology for Intelligent Network Services in $7.8–Million Agreement"; Jan. 15, 1997; Geotel Communications Corporation—Press Release.

Geotel Communications; "GeoTel Communications Corp. Expands Its Family of Virtual Call Center Solutions"; Feb. 5, 1997; Geotel Communications Corporation—Press Release.

Geotel Communications; "GeoTel Communications Announces Significant Order for its Intelligent CallRouter Software from American Express"; Feb. 26, 1997; Geotel Communications Corporation—Press Release.

Geotel Communications; "Lucent Technologies and GeoTel Communications Announce Worldwide Distribution Agreement"; May 6, 1997; Geotel Communications Corporation—Press RElease.

Geotel Communications; "GeoTel Communications Corporation Receives $1.5–Million Order from First USA"; May 20, 1997; Geotel Communications Corporation—Press Release.

Geotel Communications; "Sprint to Resell High–Performance GeoTel Software"; Jun. 3, 1997; Goetel communications Corporation—Press Release.

Geotel Communications; "GeoTel Communications Corporation Announces General Availability of Network Intelligent CallRouter Version 2.0"; Aug. 19, 1997; Geotel Communications Corporation—Press Release.

Geotel Communications; "GeoTel Communications Corporation Introduces Intelligent CallRouter Version 2.0"; Aug. 19, 1997; Geotel Communications Corporation—Press Release.

Geotel Communications; "GeoTel Raises the Bar for Computer Telephony Integration (CTI)"; Aug. 19, 1997; Geotel Communications Corporation—Press Release.

"Intriducing the GeoTel Intelligent CallRouter"; 1994; Tele-Professional, Inc.

Dawson, K.; "Intelligent CallRouter—GeoTel's carrier–independent virtual call center software."; Mar. 1995; p.78; Call Center Magazine.

Kelly, P.; "CTI—Re–Engineering Enterprise Call Centers"; Jul. 1996; Telemarketing & Call Center Solutions.

Volpe L.; "Taking Control of the Network"; Apr. 1996; Teleprofessional, vol. 9, No. 4.

"The Best Call Centers of 1996"; Jan. 1997; p. 1; Call Center Magazine.

"Moving Toward Network–based Services"; Nov. 1996; Business Communications Review.

"Geotel's New Deal"; Sep. 1996; Call Center Magazine.

Swystun; "Geotel's Slick Intelligent Call Router"; Apr. 1996; Computer Telephony.

American National Standard for Telecommunications; "Call Forwarding Unconditional Service—Supplementary Service Description"; Dec. 16, 1988; pp. 104–108; Amercan National Standard T1.xxx–1988.

American National Standard for Telecommunications; "Call Forwarding Busy Service—Supplementary Service Description"; Dec. 16, 1988; pp.109–112; American National Standard T1.xxx–1988.

American National Standard for Telecommunications; "Call Fowarding No Reply Service—Supplementary Service Description"; Dec. 16, 9/88; pp. 113–116; American National Standard T1.xxx–1988.

AT&T; "Stage 1 Service Experts of T1S1.1"(letter); Apr. 27, 1989; AT&T.

Genesys; "Call Center Manager"; Brochure, Genesys Labs, undated.

Genesys; "Call Router"; Brochure, Genesys Labs, undated.

Genesys; "Call Concentrator"; Brochure Genesys Labs, undated.

Genesys; "Client Application Interface"; Brochure Genesys Labs, undated.

Genesys; "Campaign Manager"; Brochure, Genesys Labs, undated.

AT&T; "ISDN Basic Rate Interface Specification—5E4 Generic Program"; Sep. 1985; pp. I1–I4, V3, V21–V26, V65–V91.

Infoswitch; "Inbound Call Management"; Brochure; Infoswitch; undated.

Genesys Labs; "CTI to . . . Genesys net.Vectoring"; Brochure, undated.

COMMUNICATIONS SYSTEM USING A CENTRAL CONTROLLER TO CONTROL AT LEAST ONE NETWORK AND AGENT SYSTEM

CROSS-REFERENCES TO RELATED APPLICATIONS

This application is the National Stage Application of PCT Application Ser. No. PCT/US96/02890 filed Mar. 4, 1996, and is a continuation-in-part of U.S. patent application Ser. No. 08/398,950, filed on Mar. 2, 1995, which issued as U.S. Pat. No. 5,546,452 on Aug. 13, 1996.

BACKGROUND OF THE INVENTION

1. Field of the Invention

The present invention relates generally to a communications system and method for operating same. More specifically, the present invention relates to a distributed, fault-tolerant communications system and method for operating same that makes real-time, call routing decisions based upon system-wide resource utilization preferences and information. Particular utility for the present is found in the area of call distribution through a public network (e.g. a public telephone network) to and through agent systems having a plurality of diverse individual workgroups and caller services (e.g. interactive voice response and/or voice mail systems), although other utilities are also contemplated.

2. Brief Description of Related Prior Art

Systems for routing calls through public or private communications networks are known in the art. Conventional automatic call distribution (ACD) systems route calls to agents in telemarketing and service inquiry centers, and provide limited real-time call management and reporting capabilities. A typical ACD system will monitor the status of the agent and, when an incoming call is received, selects the agent to handle a particular service request. Reporting and performance data from the agents are also generated by the ACD.

One particular type of scheme for distributing calls to agents is disclosed in Frauenthal et al., U.S. Pat. No. 4,737,983. According to Frauenthal et al, data representing the present call congestion of each of the ACD systems is accumulated in a data base. Using the data in the data base, the percentage of calls made to the ACD systems, as a group, is determined. The information is then used to generate call routing information. When a new call is made to the central office, the routing information is queried to determine which of the ACD systems is to receive the call, so as to balance the call traffic load across the ACD systems.

Another call distribution scheme is provided in Gechter et al., U.S. Pat. No. 5,036,535. This patent discloses a system for automatically distributing telephone calls placed over a network to one of a plurality of agent stations connected to the network via service interfaces, and providing status messages to the network. Gechter et al's disclosed system includes means for receiving the agent status messages and call arrival messages from the network, which means are connected via a network service interface to the network. Routing means responsive to the receiving means is provided for generating a routing signal provided to the network to connect the incoming call to an agent station through the network. In the system disclosed in Gechter et al, when an incoming call is made to the call router, it decides which agent station should receive the call, establishes a call with that agent station, and then transfers the original call onto the second call to connect the incoming caller directly to the agent station and then drops out of the connection. (See, Gechter et al., column 11, lines 45–51).

U.S. Pat. No. 5,193,110 issued to Jones et al discloses an integrated services platform for a telephone communications system which platform includes a plurality of application processing ports for providing different types of information services to callers. In Jones et al's disclosed system, a master control unit and a high speed digital switch are used to control processing of incoming phone calls by recognizing the type of service requested by the caller and then routing the call to the appropriate processing port. The Jones et al system is disclosed as an adjunct to current switching technology in public and private networks.

Another call routing system is the Enhanced 800 Service provided by AT&T. Enhanced 800 Service allow calling customers to split calls and direct them to multiple call centers. Unfortunately, among its many disadvantages, this system is predicated upon the notion that system dynamics are relatively static (i.e., that call volumes do not change drastically and that proper system functioning is a "given"). However, given the dynamics of the modern telecommunications market, this notion is often very strong.

Unfortunately, none of the aforesaid prior art systems discloses integrated means for controlling both the routing of calls to the agent and/or caller service systems, operation of the agent and/or caller service systems themselves, and the various management and administration functions (e.g. compilation and updating of call management, preferences, and status information databases, and inputting of user control preferences) since no single ("global") controller completely controls processing and distribution of all calls throughout the system, and administrative functions. Thus, disadvantageously, the prior art fails to provide means for optimally utilizing system resources according to unified optimization criteria. Additionally, the prior art fails to provide adequate means for preventing catastrophic system failure in the event of controller malfunction and/or failure of other important elements of the system.

SUMMARY OF THE INVENTION

Accordingly, one preferred embodiment of the present invention provides a communications system (and method for operating same) having integrated central control of both the routing of calls to the agent and/or caller service systems, the operation of the agent and/or caller service system themselves, and administrative functions. Advantageously, the system and method of this embodiment of the present invention permit a single central controller to completely control all distribution of calls throughout the entire network (i.e. even in and through separate agent and caller service systems). This permits all of the resources of the system to be allocated according to unified optimization criteria so as to permit optimal system resource utilization. Also advantageously, this embodiment of the present invention permits truly global (i.e. system-wide) administration and control.

Additionally, in preferred embodiments of the present invention, the system provides enhanced routing capabilities by collecting from the network caller information such as dialed number, calling line ID, and caller entered digits. In such preferred embodiments, prior to connection of the call to its ultimate termination point, the system uses the caller-entered digits, calling line ID and other system information to formulate a routing command back to the public network. The routing command may cause the network to deliver the physical call to the call termination point along with DNIS or system information carried in the user-to-user field of the ISDN setup message. Advantageously, this permits explicit control of the interchange carriers connecting the call to the target termination, based upon a diverse set of criteria, including caller accounts and personal ID numbers.

Another preferred embodiment of the system of the present invention essentially comprises a plurality of public networks for interconnecting a plurality of calls to a plurality of respective agent systems. Each of the agent systems includes a plurality of workgroups. This embodiment also comprises up to two central controllers for generating control signals to control the public networks and the agent systems to optimally route the calls through the networks and the agent systems to certain of the workgroups. The central controllers are adapted to generate the control signals based upon status messages received from the agent systems, requested service data from the network, and optimization parameters. The central controllers include two controllers configured in a redundant manner for controlling the system in the event of failure of one of the controllers. The central controllers may be geographically separated from each other. This embodiment also includes synchronizer means for virtually synchronizing respective internal states of the central controllers, and interfacing means for interfacing the central controllers to the public networks and gateway means for interfacing the central controllers to the agent systems.

A third preferred embodiment of the system of the present invention essentially comprises at least one telephone network for interconnecting at least one telephone call to at least one telephone call service, and at least one Internet network for connecting an Internet call to at least one Internet service. The telephone network and call services are controlled by control signals supplied thereto from a primary central controller for generating the control signals so as to optimally route said telephone call between the telephone network and the telephone call service, and also so as to optimally connect the Internet call and the Internet call service, based upon status messages received from the call services, requested service data from the networks, and optimization parameters.

Preferably, in this third embodiment, each of the call services comprise at least one agent workstation, which may or may not be associated with an ACD or PBX. Also preferably, the telephone call service includes an IVR or similar system, and the Internet call service includes at least one Internet multimedia service provider. In this embodiment, at least one workstation is networked to a caller information database.

A fourth preferred embodiment of the present invention essentially comprises at least one public network for interconnecting a plurality of voice calls to at least one caller service and/or agents via a switching system. The switching system and at least one network are controlled by a central controller so as to optimally route the calls to the caller services and/or agents, which are also controlled by the central controller. Preferably, the caller service comprises an IVR connected to the switching system. The switching system may be connected to the agents via the at least one network or via an appropriate interface.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

BRIEF DESCRIPTION OF THE DRAWINGS

Other features and advantages of the present invention will become apparent as the following Detailed Description proceeds, and upon reference to the Drawings, wherein like numerals depict like parts, and wherein.

DETAILED DESCRIPTION OF PREFERRED EMBODIMENTS

Figure 1:
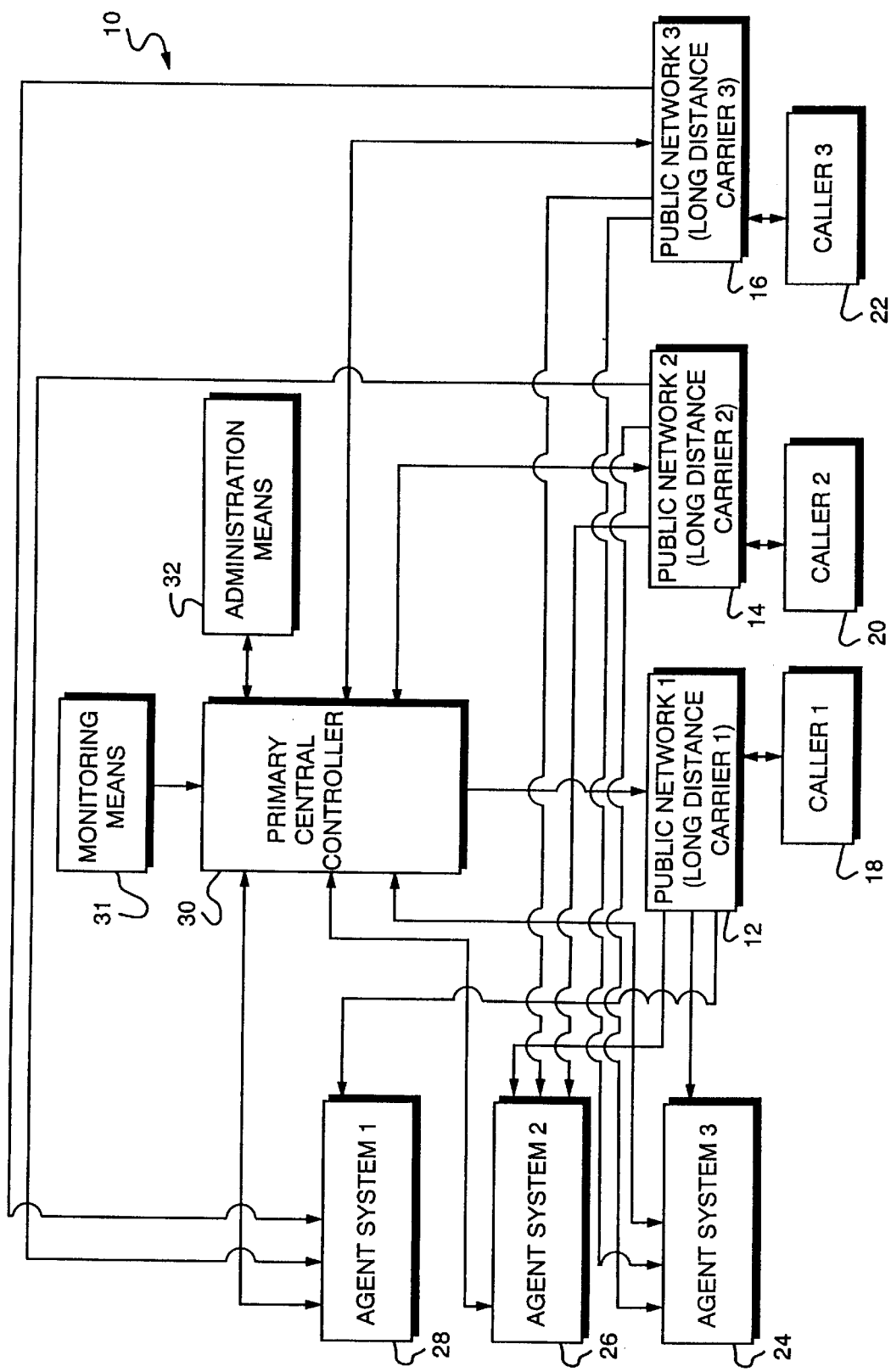
FIG. 1 is a functional block diagram of one preferred embodiment of the present invention.

FIG. 1 is an architectural-level block diagram of the various functional components of one preferred embodiment 10 of the system of the present invention. System 10 includes at least one 24, and preferably a plurality of agent systems 24, 26, 28 connected to a primary central controller 30 and at least one 12, and preferably a plurality of conventional public telephone and/or long distance carrier networks (e.g. MCI, Sprint, AT&T) 12, 14, 16. Callers 18, 20, 22 place calls to the agent systems 24, 26, 28 via public networks 12, 14, 16. As will be explained more fully below, primary central controller 30 generates control signals for controlling distribution of calls through the long distance carriers to the agent systems, and through the agent systems themselves to individual workgroups, customer agents and/or caller services, based upon requested service data (e.g. telephone numbers and other information) supplied by callers through the public networks, status messages (i.e. availability of resources for use by callers, loading of system resources, etc.) supplied by the agent systems, and optimization parameters (i.e. user supplied criteria for how the system is to balance competing concerning for use of system resources) stored in controller 30. Administration means 32 permits user access and control of the system 10 by, for example, permitting dynamic changing of optimization parameters, system configuration data, etc. stored in controller 30. Monitoring means 31 monitors the various elements of the system (i.e. the agent systems 24, 26, 28, administration means 32, etc.) to determining whether these elements are functioning properly. If a malfunction is detected, that fact is signaled to the central controller 30, so that it can undertake appropriate action to correct and/or eliminate the malfunction and/or any resulting problems to the system 10 from the malfunction.

It is important to note at the outset that, although not shown in the Figures, each of the conventional long distance carriers 12, 14, 16 includes a long distance control network (e.g. AT&T's Signaling System 7 (SS7) control network, MCI's TCP/IP-based control network, Sprint's X.25-based control network and/or foreign telecommunication's CCITT SS7-based control network) and local exchange carriers. The long distance control networks control routing of calls through the long distance network serviced by the exchange carriers. When a long distance call request is received (e.g. a caller dials a long distance telephone number) by the exchange carrier, it forwards the call to the long distance network, which routes the call to its intended destination. In accordance with this embodiment of the present invention, the long distance control network is programmed such that when the long distance control network receives a request for long distance connection to one of the agent systems 24, 26, 28 (or, as will be explained more fully below, to one of the agent's systems workgroups or caller services), the long distance control network forwards the long distance routing request to the central controller 30. The central controller then processes the request and controls the system 10 to optimally utilize the system's resources (i.e. to minimize calling cost by routing the call along the lowest cost route, to balance system loading by routing the call to the resource with the lowest current load, to maximize call localization by routing the call to the resource closest to its origination point, or to use a combination of the foregoing and such other techniques), in the manner described more fully below. As used herein, the system's "resources" include its agent systems, caller services and/or individual agent workgroups. As will be seen, the system accomplishes call routing by, inter alia, translating the routing request message into a route response message for addressing the desired agent system. It is also important to note that system 10 also supports routing of calls across local exchange carriers and international PTT's by utilizing substantially the same call control and distribution techniques discussed above.

Figure 2:
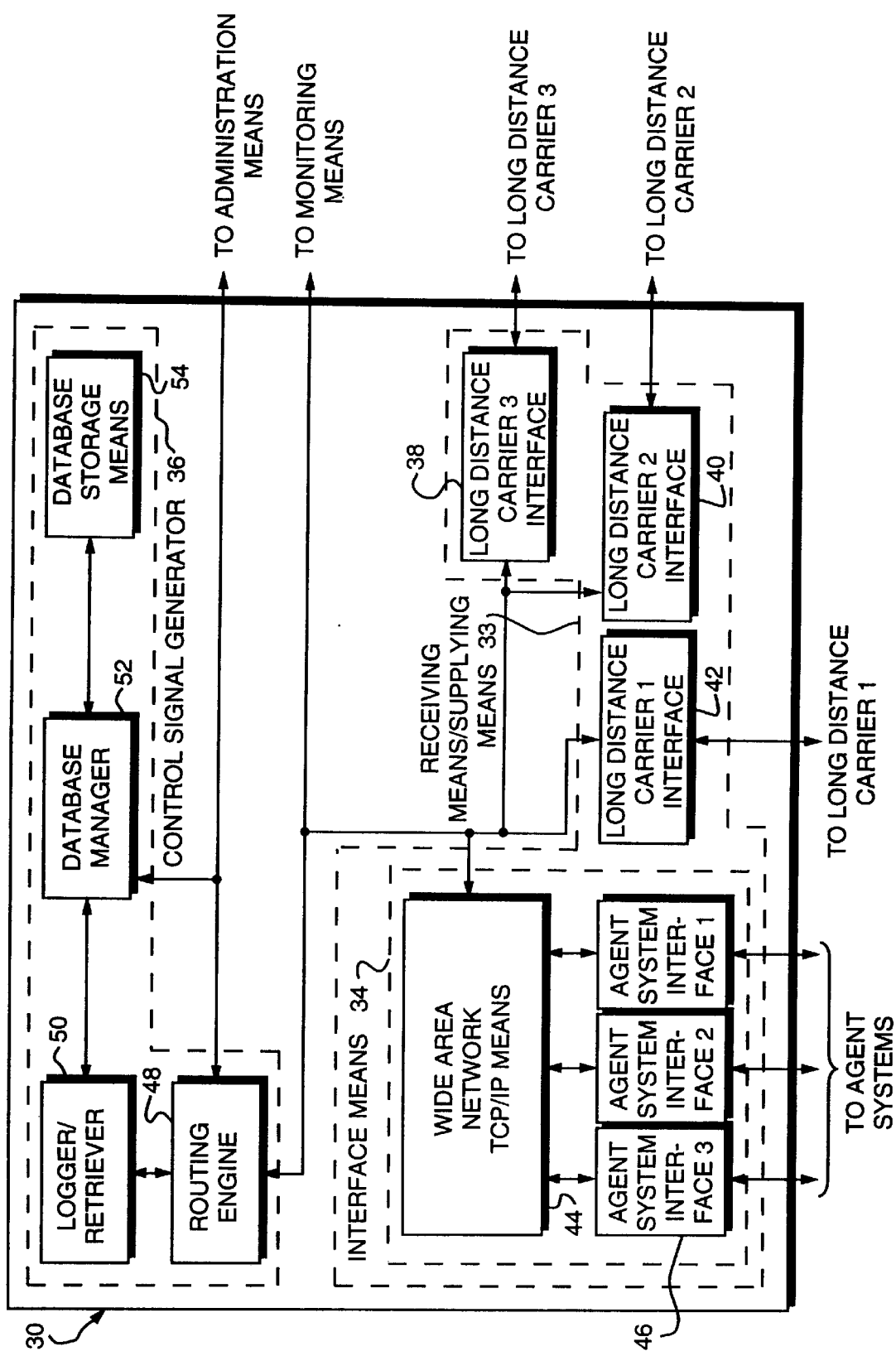
FIG. 2 is a functional block diagram of the primary central controller of the preferred embodiment of FIG. 1.

FIG. 2 is a schematic block diagram of the various functional components of the central controller 30. Controller 30 includes means 33 for receiving status messages and caller service requests, and for supplying control signals generating by the controller 30 to the public networks and the agent systems. Receiving and supplying means 33 includes long distance carrier interfaces 38, 40, 42 for interfacing the controller 30 to the public networks 12, 14, 16, respectively, each of which interfaces is appropriately adapted to permit transmission of control signals and receipt of caller service requests from the respective network to which it is connected. For example, if carrier interface 42 is connected to an AT&T SS7 network, then it is appropriately configured to permit transfer of control signals and service requests between the controller 30 and the SS7 network. Other types of carriers must also be similarly accommodated by appropriately configuring the other interfaces 40, 38 to permit exchange of such data between these networks and the controller 32.

Receiving and supplying means 33 also includes agent gateway (interface) means 34 for interfacing the controller 30 to the agent systems 24, 26, 28. Preferably, interface means 34 includes agent systems interfaces 46 connected to conventional wide area network means 44. Wide area network 44 connects the controller to the interface means whereby to permit transmission of status messages from the agent systems to the controller, and to permit transmission of control signals to the agent systems. It should be understood that the particular types of interfaces 46 used will depend upon the particular constructions of the agent systems, the wide area network, and the controller. Wide area network 44 preferably is of the TCP/IP (Transmission Control Protocol/Internet Protocol) type, although if system 10 is appropriately modified other types of conventional network means may be used to construct network 44 without departing from this embodiment of the instant invention.

Also shown in FIG. 2 is the control signal generator means 36, which is connected to the receiving and supplying means 33, monitoring means 31, and administrative means 32. Control signal generating means 36 comprises routing engine 48, database logger/retrieving means 50, database manager means 52, database storage means 54. Preferably, routing engine 48 determines how to optimally route calls in the system 10 (i.e., through the public networks to the agent systems, and in the agent systems themselves), and transmits this routing information (in the form of appropriate control signals, such as routing response messages for addressing the desired end-termination (i.e. workgroup/caller service) in the system to interface means 34 and receiving/supplying means 33 for transmission to the agent system and long distance control networks, respectively. In order to determine how best to route calls in the system, routing engine 48 takes into consideration real-time requested service data supplied to it by the receiving and supplying means 33, historical (i.e. previously stored) requested service data retrieved by logger/retriever means 50 at the command of the routing engine 48 from the system's historical database (comprising database manager 52 and storage means 54), real-time status messages from the agent systems supplied to it from the interface means 34, historical status messages retrieved from the system's database, information from the monitoring means concerning what components (if any) of the system are currently unavailable because they are malfunctioning or inoperative, and optimization criteria and/or rules stored in the database via the administration means. Routine engine 48 uses this data to calculate the optimal way to route calls in the system by applying to this data conventional optimization algorithms and/or strategies known to those skilled in the art, including but not limited to routing the call to the highest skilled and longest available (i.e. longest inactive) agent in a workgroup. After making its decision on how best to route a particular call, generating appropriate control signals to implement this decision, and transmitting the control signals to the interface means 34 and receiving/supplying means 33, routing engine 48 instructs logger means 50 to store the real-time information presented above in the database for use in determining how to route later calls. Logger means 50 in turn, commands database manager 50 to store this information in database storage means 54. It should be appreciated that manager 52, and database storage means 54 may also be of conventional construction. Database 54 may also contain corporate and/or customer profile routing preference information for use by router 48 in determining how best to route calls through the system. Such information may include services previously or most commonly used by certain callers identified by calling line information data, personal identification numbers, etc. and may be used by the routing engine to route such calls to services most likely to be used and/or specifically tailored for use by the callers.

Figure 4:
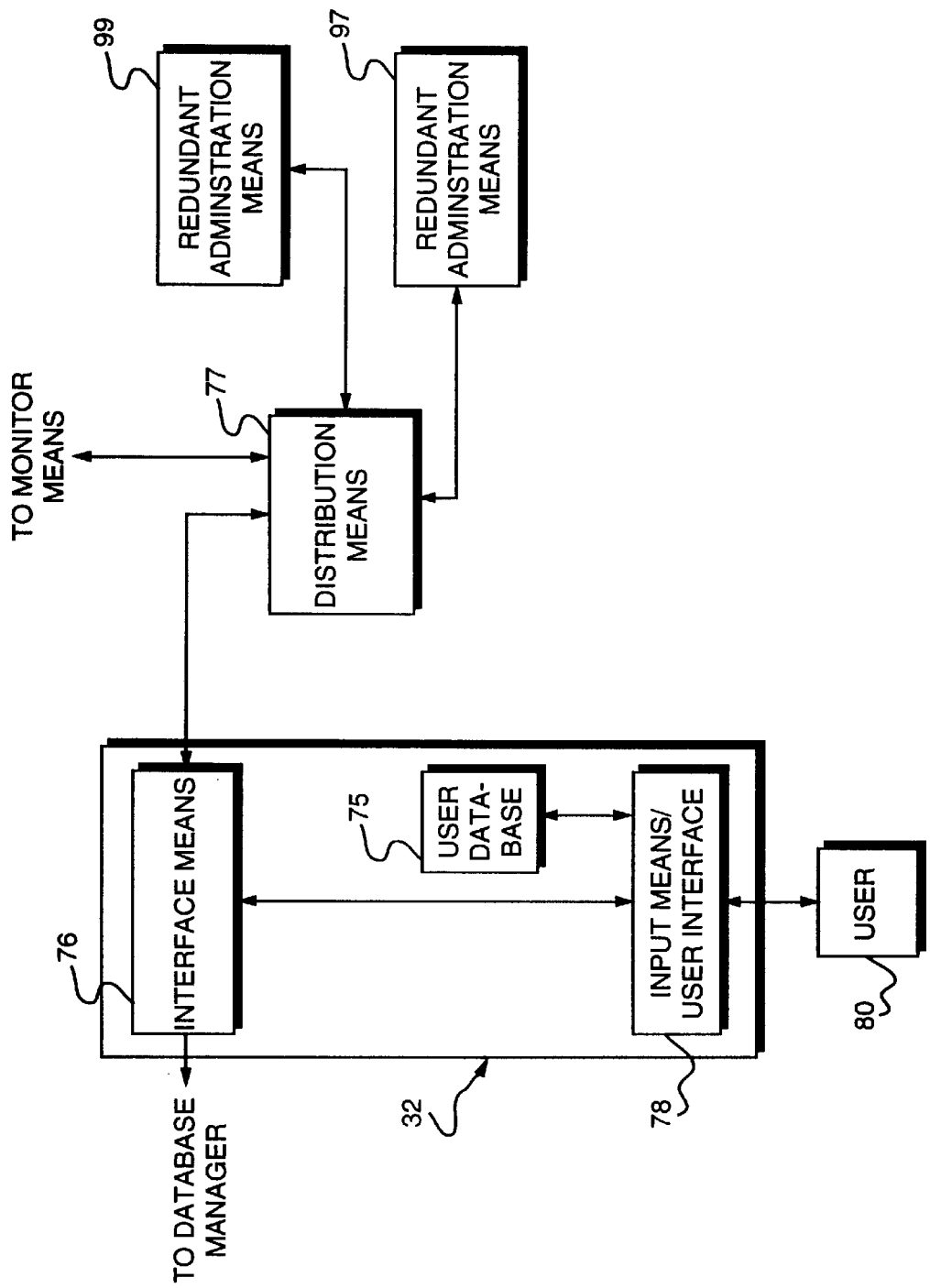
FIG. 4 is a functional block diagram of the administrative means of the preferred embodiment of FIG. 1.

FIG. 4 is a functional block diagram of administration means 32. Administration means 32 preferably comprises user input/output interface means 78 connected to central controller interface means 76. User interface means 78 preferably comprises one or more IBM-type, Intel 80486, Pentium™ or RISC-based workstations programmed to have graphical-type user interfaces (running e.g. in a Microsoft Windows™ environment) for permitting users to change call routing optimization parameters, system configuration data, etc. stored in the database of the central controller. The database interface means 76 is adapted to change the user's graphically input data into a form usable by the central controller to update and/or otherwise change system information stored in the central controller's database. Administration means 32 comprises a user-accessible database means 75 for storing real-time information and configuration information and for permitting such information to be communicated to users via the user interface means 78. Also preferably, administration means 32 permits a user to monitor various system activities and current system information, such as, call routing, system configuration, etc.

Optionally, the system may comprise distribution or repeater means 77. Distribution means 77 replicates data received from the central controller and distributes the data to the administration means 32, 97, 99. Advantageously, this permits the system to comprise multiple administration means 32, 97, 99 distributed (and preferably geographically separated) throughout the system. Thus, the system may be administrated from multiple geographically separated locations.

Figure 3:
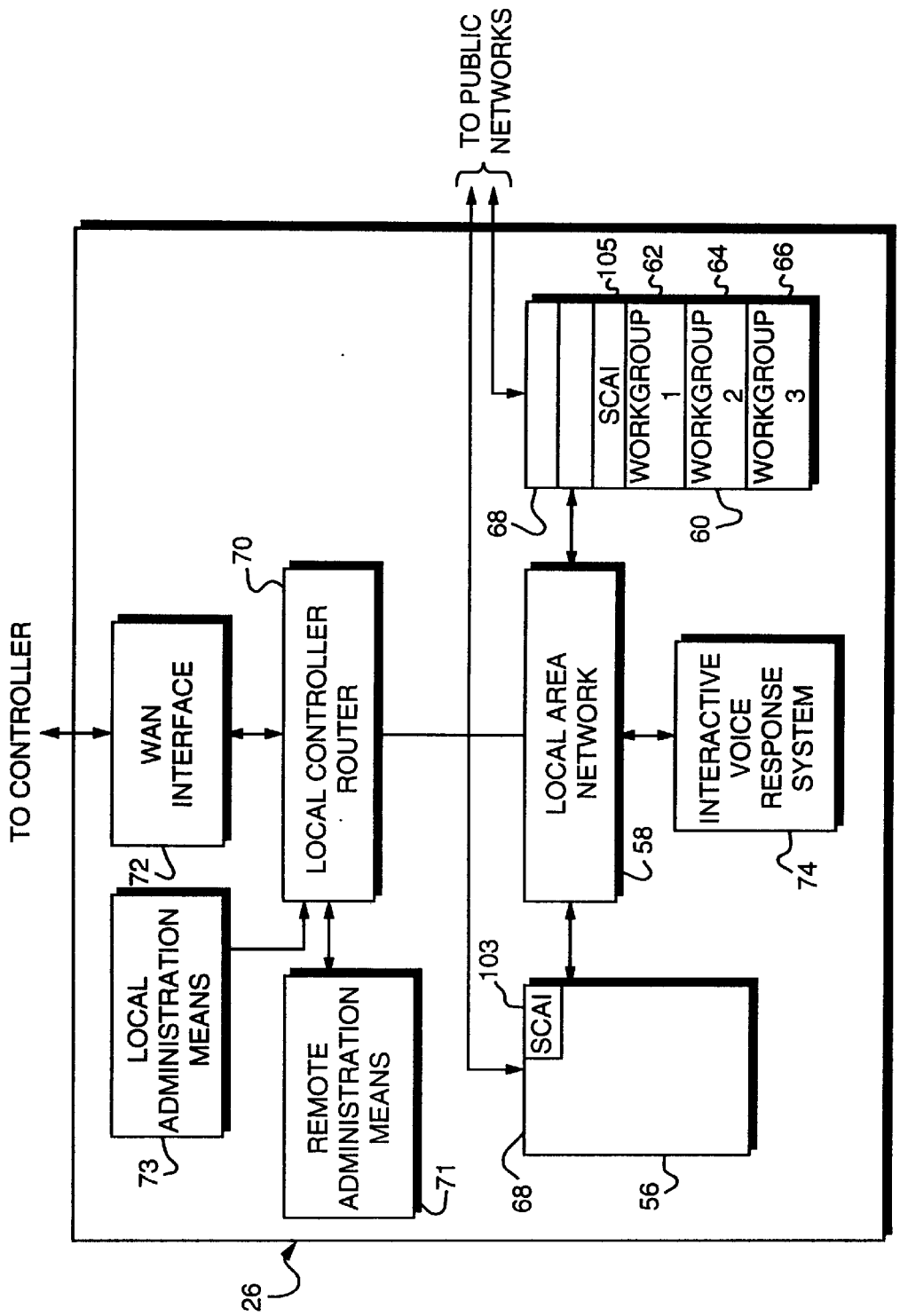
FIG. 3 is a functional block diagram of an agent system of the preferred embodiment of FIG. 1.

FIG. 3 is a functional block diagram of an agent system 26 according to this embodiment of the instant invention. Agent system 26 preferably comprises wide area network interface means 72 for interfacing the agent system's location controller/router 70 to the controller's wide area network 44, so as to permit transfer of control signals from controller 30 to local controller 70 and status message from the local controller 70 to controller 30. In response to control signals received by local router 70 from controller 30, local router 70 issues commands to the ACD/IVR or PBX System causing the public network interfaces 68 in the ACD, PBX or IVR to connect calls received thereat from the public networks to appropriate conventional caller services (e.g. interactive voice response system 74) or individual agents (e.g. private branch exchange (PBX) 56 or ACD 60). Types of PBX's and ACD's that may be included in the agent systems of this embodiment of the instant invention include those made by the following companies: Rockwell, Aspect, AT&T, Northern Telecom, ROLM, NEC and Infoswitch. It should be noted that the particular type and number of caller services and individual agents shown in FIG. 3 are merely for illustrative purposes, and may be modified as desired without departing from this embodiment of the instant invention. Local router 70 issues commands via the conventional local network means 58 to the caller service or individual agent system to which the call is connected, as to how the individual agent or caller service is to distribute or process the call. For example, depending upon the control signals transmitted by the controller 30 to controller 70, controller 70 may instruct the call to be forwarded directly to the interactive voice response system 74 which is connected as an answering resource to ACD 60, and instruct the interactive voice response system to store information from the call for later retrieval and transmission to a workstation (not shown) connected to the PBX 56, or to connect the call to the ACD 60 and instruct the ACD to forward the call to one of its workgroups 62, 64, 66. Of course, it will be appreciated that if appropriately modified, the interface 68 may be comprised within the public networks or may comprise a separate, stand-alone interface distinct from the agent systems. Likewise, if the PBX, IVR, and/or ACD are appropriately modified so as to include other of the various functional components of the agents (e.g. router 70), they may be eliminated, or comprised as separate functional components from the agent system.

Local controller 70 also queries the individual agents and caller services for status information (i.e. whether they are active, what resources are available for use by callers, etc.), gathers this status information via the local network 58, and transmits this information to the central controller 30 via interface 72 for use in the central controller's routing decisions. In this way, the central controller 30 may automatically control routing of calls not only through the public networks, but also in the agent systems, according to status information gathered from the entire system, using global call distribution criteria. It should be understood that local router 70 is of similar construction to control signal generator means 36, except that local router 70 is adapted to control distribution of all only within its agent system and in accordance with routing commands issued by the central controller 30.

Agent system 26 may also comprise local administration means 73 for permitting user control of the local router 70, and remote administration means 71 for permitting remote control of central controller 30. Both administration means 73, 71 are of similar construction to administration means 32. Local administration means 73 may be adapted to as to be limited in its control of local router 70 only to matters not being controlled by central controller 30. Likewise, remote administration means 71 may be limited in its authority over system 10 such that administration means 32 may override commands issued by administration means 71.

Figure 5:
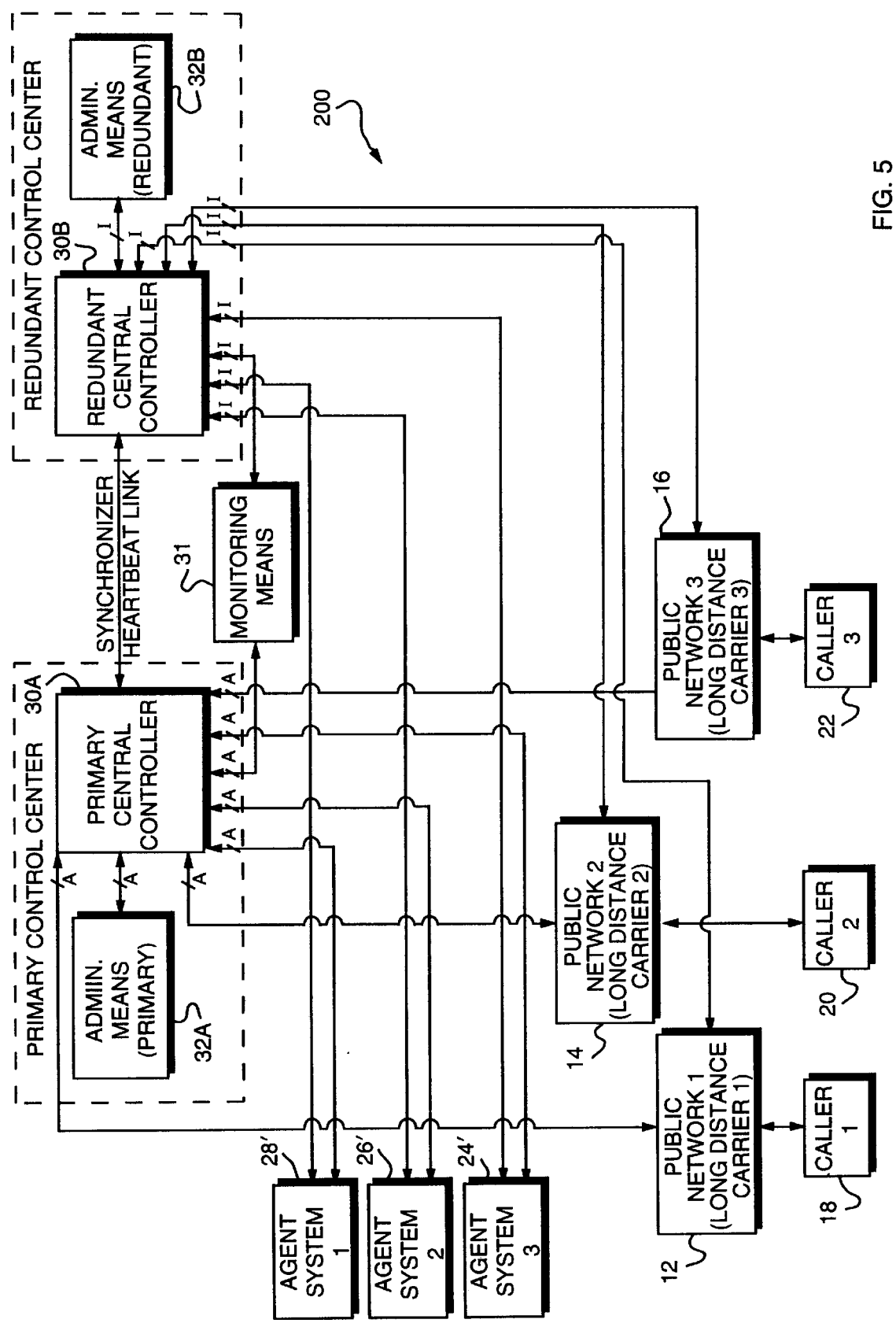
FIG. 5 is a functional block diagram of another preferred embodiment of the present invention, in which figure the interconnection lines between the public networks and the agent systems have been omitted for purposes of clarity, but should be understood to exist nonetheless.
Figure 6A:
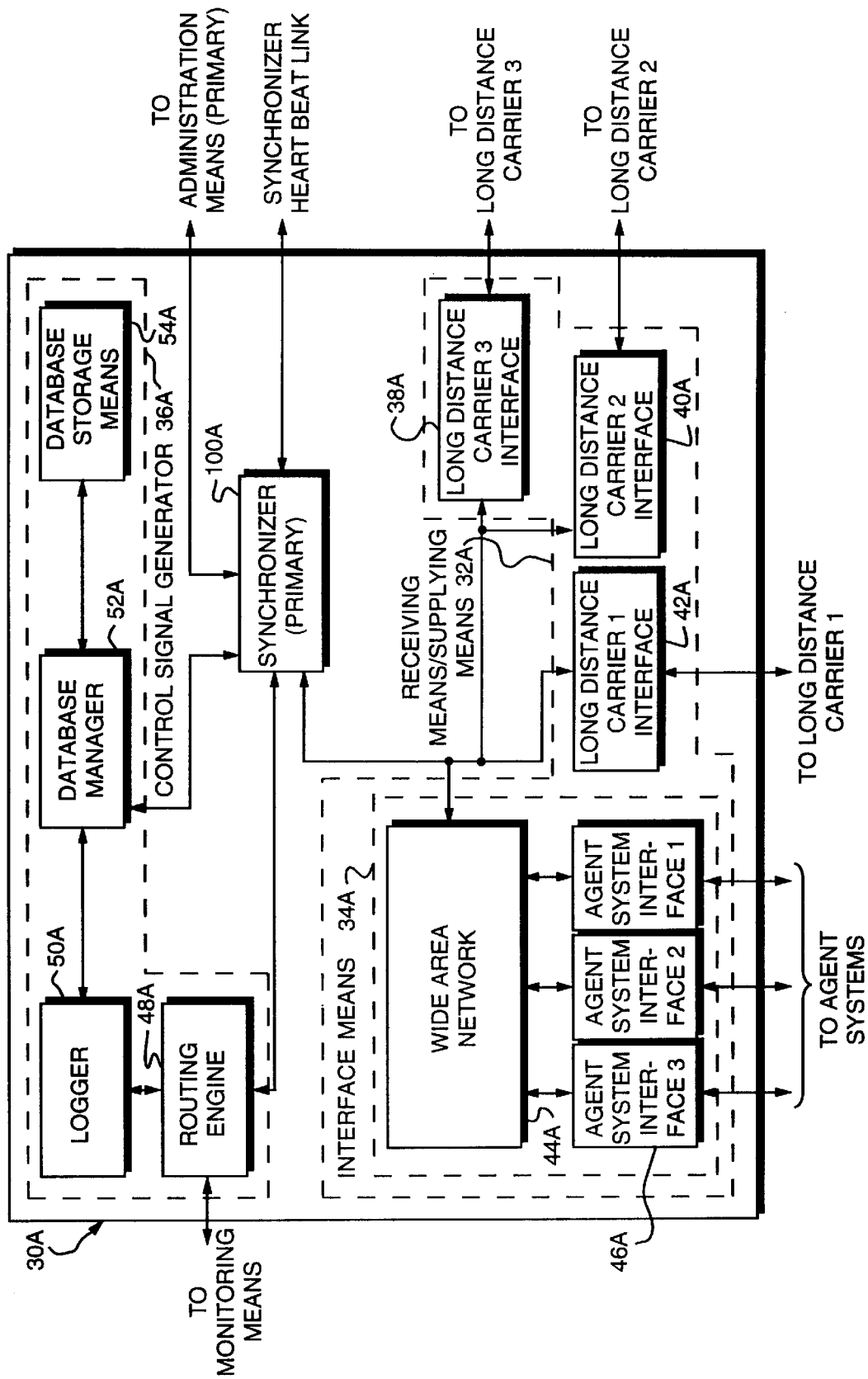
FIG. 6A is a functional block diagram of the primary central controller of the preferred embodiment of FIG. 5.
Figure 6B:
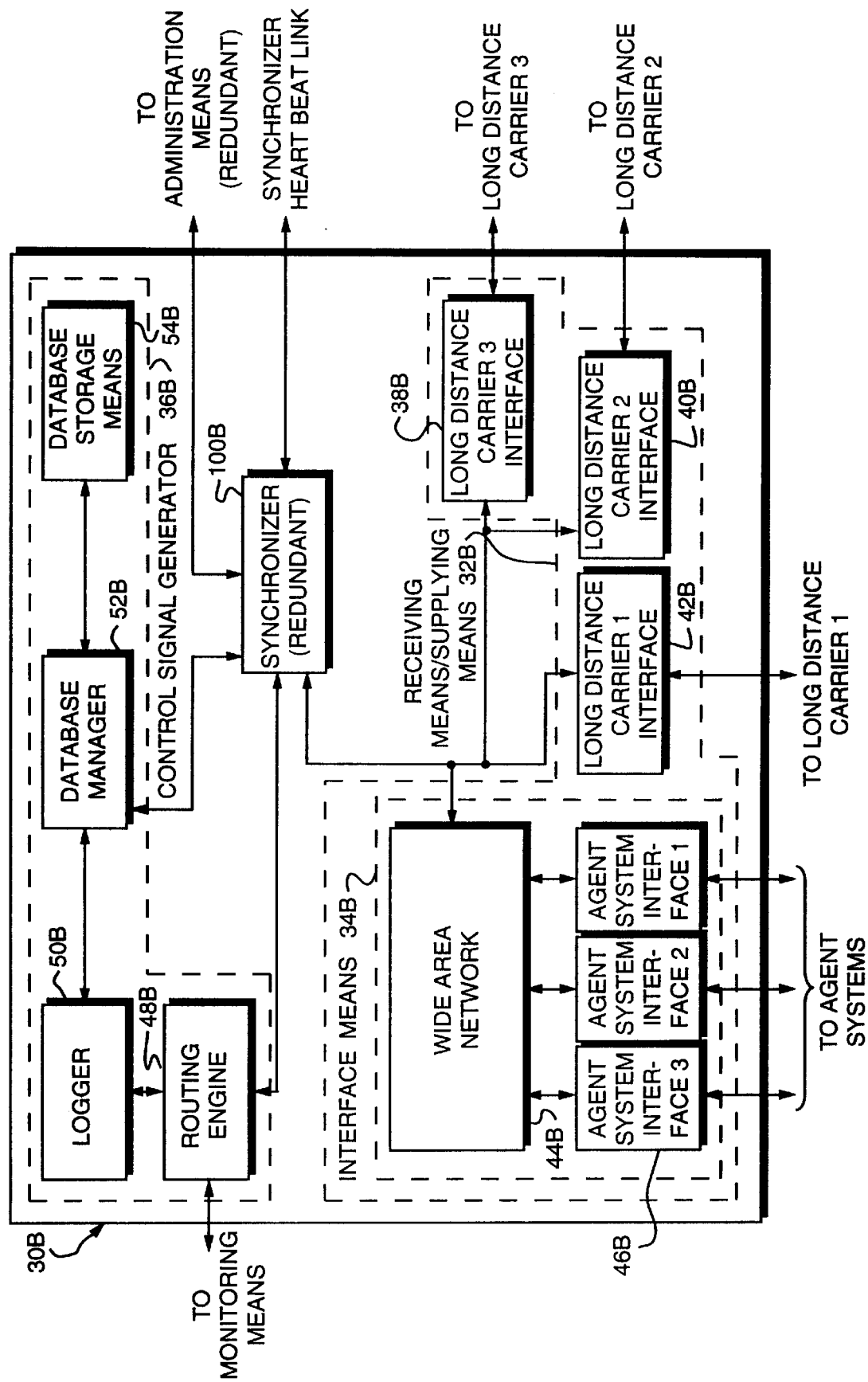
FIG. 6B is a functional block diagram of the redundant central controller of the embodiment of FIG. 5.
Figure 7:
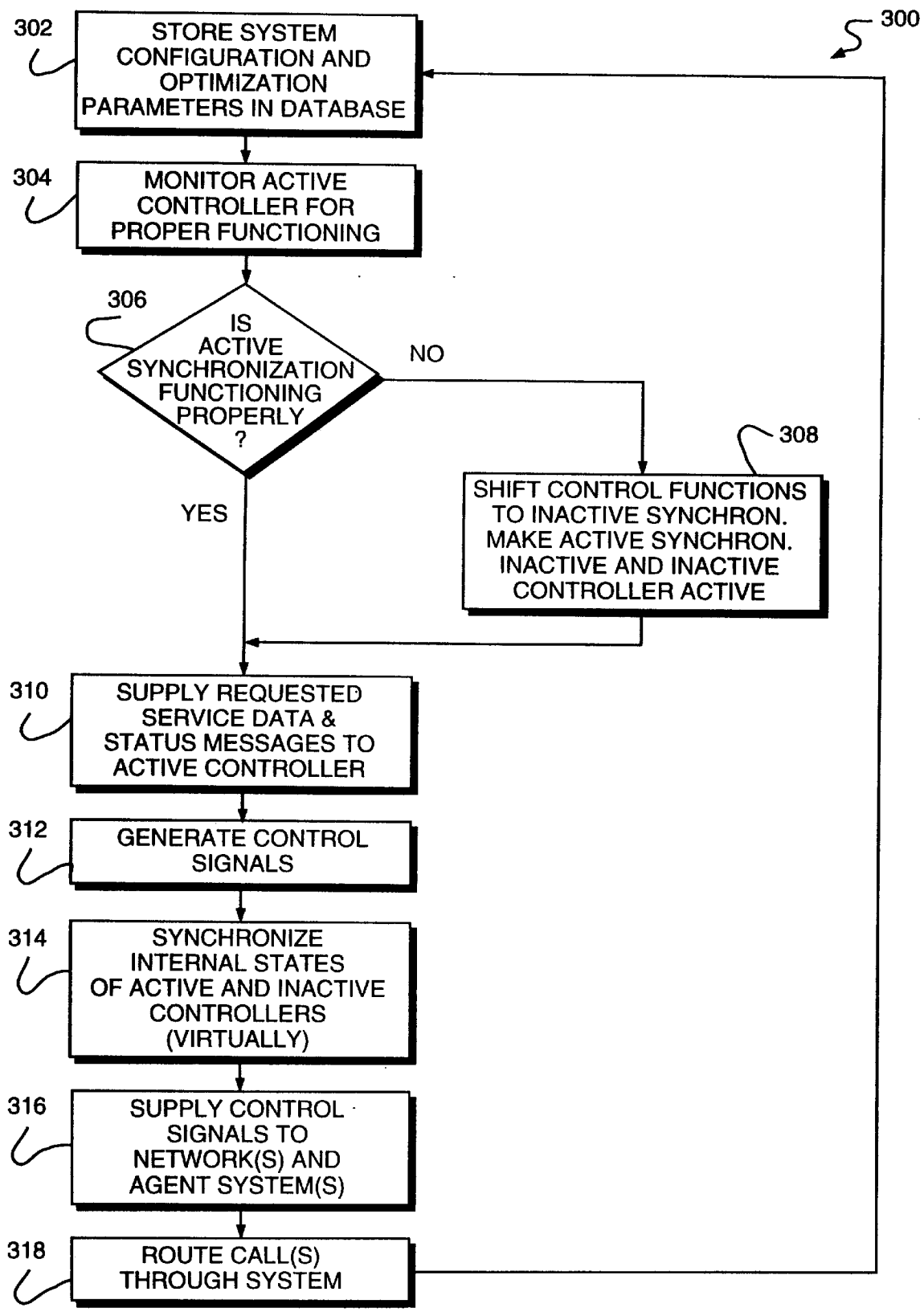
FIG. 7 is a flowchart illustrating the operational flow of the preferred embodiment of FIG. 5.

FIG. 5 is an architectural-level block diagram of another preferred embodiment 200 of the system of the instant invention. Unless otherwise stated, the functional components and operation of the system 200 are substantially similar to those of system 10. System 200 includes at least one 24', and preferably a plurality of agent systems 24', 26', 28' connected to a primary central controller 30A and a redundant central controller 30B, and at least one 12, and preferably a plurality of conventional public telephone and/or or long distance carrier networks 12, 14, 16. Callers 18, 20, 22 place calls to the agent systems 24', 26', 28' via public networks 12, 14, 16 which, although not shown explicitly in FIG. 5 as being connected to the agent systems, are in fact so connected. The central controllers 30A, 30B are connected to monitoring means 31'. Central controllers 30A, 30B are connected to each other by a synchronizer link (which preferably comprises a suitable wide area network connection means), the purpose of which will be described more fully below. Also, for reasons that will become apparent below primary central controller 30A and administration means 32A are physically located at a primary control center. Likewise, redundant central controller 30B and administration means 32B are physically located at a redundant control center. The redundant control center and the primary control center may be geographically separated from each other. For purposes of the following discussion, connections made from the primary central controller 30A to the other components of system 200 are designed as active (i.e. with the letter "A"), while connections made from the redundant controller 30B are designated inactive (i.e. with the letter "I").

With reference now being made specifically to FIGS. 5, 6A, 6B, 7 and 8, the operation of the primary and redundant controllers 30A, 30B in system 200 will now be discussed. Advantageously, use of primary and redundant controllers in system 200 permit system 200 to exhibit a high-degree of fault-tolerance and help prevent catastrophic system failures.

In order to add fault-tolerance to the system 200, all critical functions of the system are duplicated on geographically-separated controllers 30A, 30B, which are connected in parallel to various other components of the system 200. As is known to those skilled in the art, two basic approaches exist to achieve fault-tolerance through duplication of system functions: the "hot-standby approach" and the "synchronized execution approach". In the hot-standby approach, one set of redundant functions is termed the "primary" functions, while the other set is termed the "backup" or "redundant" functions. Under normal conditions (i.e. in the absence of a failure condition), the primary functions perform the system's tasks while the redundant functions are idle. In the synchronized approach, neither the primary nor the redundant functions are idle under normal conditions, they both operate simultaneously to process duplicate inputs and produce duplicate outputs. System 200 utilizes both approaches.

At any given time one synchronizer is enabled (or "master") while the other synchronizer is disabled (or "slave"). In the System 200, synchronizer 100A of primary controller 30A is enabled, while synchronizer 100B of redundant controller 30B is disabled. The enabled synchronizer 100 is responsible for determining the order of data provided to the routers 48A, 48B of the central controllers 30A, respectively, and transmitted therefrom. This is necessary so as to virtually synchronize the internal states of the routers in both central controllers, so as to permit the redundant central controller 30B to take over control functions in the system should the primary central controller 30A fail. As used herein, "virtual synchronization" is intended to mean that the control signal generating means of both central controllers receive and process status messages and service requests in the same order, and both central controllers transmit control signals in the same order. It is unlikely that the synchronizers produce actual synchronization (rather than virtual synchronization), due to the time delays and differences between the two controllers of transmission of status messages, service requests, and control signals resulting from their geographical separation.

All data being sent to the routers pass through the synchronizers. Each synchronizer forwards arriving data to the other synchronizer via the synchronizer link. The enabled synchronizer transmits ordering messages to the disabled synchronizer via this link to permit the disabled synchronizer to place the data in appropriate sequence. Ordering of data transmissions to the routers is determined by the enabled synchronizer according to the interleaving of the arriving messages. Once ordering has been determined by the enabled synchronizer and confirmed, the synchronizers transmit the properly ordered data to their respective routing engines.

In addition to virtually synchronizing operation of the two controllers, the synchronizers also determine when failure of a central controller has occurred, in order to permit control functions for the system 200 to be switched to the operational controller (i.e. the one that has not failed). The synchronizers do this by sending "heartbeat" messages to each other across the synchronizer link at predetermined time intervals, in order to determine whether they are both still functioning properly. If heartbeat messages from one of the synchronizers stops being received by the other, there are two possible reasons for this phenomenon. The first possibility is that the synchronizer not sending the messages may have failed (along with its central controller). The second possibility is that the synchronizer link connection has failed.

In either event, the disabled synchronizer generates appropriate control signals and causes them to be transmitted to the agent systems. These control signals command the agent systems to send query messages to the primary central controller. If the primary central controller is functioning properly, the primary central controller acknowledges this by sending an appropriate replay message to the agent systems, which then transmit this reply to the disabled synchronizer. The disabled synchronizer then periodically attempts to re-establish communications with the enabled synchronizer, periodically retests the proper functioning of the other controller, and/or signals appropriate personnel via the administration means that a problem may exist with the heatbeat line.

If the majority of agent systems report that the enabled synchronizer is not functioning, then the disabled synchronizer becomes enabled. The newly enabled synchronizer then periodically attempts to re-establish communications with the other synchronizer, periodically retests the proper functioning of the other controller, and/or signals appropriate personnel via the administration means that a problem exists with the other controller.

Once the failed synchronizer has recovered, it initiates by default as the disabled synchronizer. It re-establishes communication with the enabled synchronizer, synchronizes the internal states of the generating means of the now redundant controller and begins normal functioning as the disabled synchronizer.

If the disabled synchronizer is found to have failed, the enabled synchronizer continues normal operation, periodically attempts to reestablish communication with the failed synchronizer, and attempts to notify appropriate personnel of the failure. Once the failed synchronizer has recovered, it initializes by default as the disabled synchronizer. It re-establishes communication with the enabled synchronizer, synchronizes the internal states of the generating means of the redundant controller and begins normal functioning as the disabled synchronizer.

It should be appreciated, however, that unless a failure condition exists in one of the two central controllers, appropriate functional components in both central controllers may operate simultaneously so as to provide a single "logical" central controller comprised of functional components from both of the central controllers. Unless such a failure condition is present, the system 200 may be adapted to accept control signals from active functional components of the two central controllers, regardless of whether those components are contained within the primary or redundant central controller.

At its most basic level, operation of system 200 begins by storing system configuration data, optimization parameters, and other system information in the databases of the central controllers (block 302). The synchronizers monitor whether the two controllers are functioning properly, as shown at block 304, in the manner discussed previously. Additionally, the monitoring means monitors proper functioning of the system 200 and informs the controllers as to any change in operation of the system. If it is determined that the active (i.e. primary) controller is not functioning properly (block 306), control of the system is shifted essentially seamlessly (from the point of view of the system) to the redundant controller (block 308). In any case, each controller receives requested service data and status messages from the public networks and agent systems at block 310 and generates control signals for routing the call through the system (as shown at block 312). The synchronizers virtually synchronize the internal states of the two controllers (as shown at block 314). The control signals are supplied to the public networks and the agent systems to route calls through the system (as shown at block 316 and 318, respectively, of FIG. 7). This process then repeats itself as newly acquired system information is stored in the databases.

Figure 8:
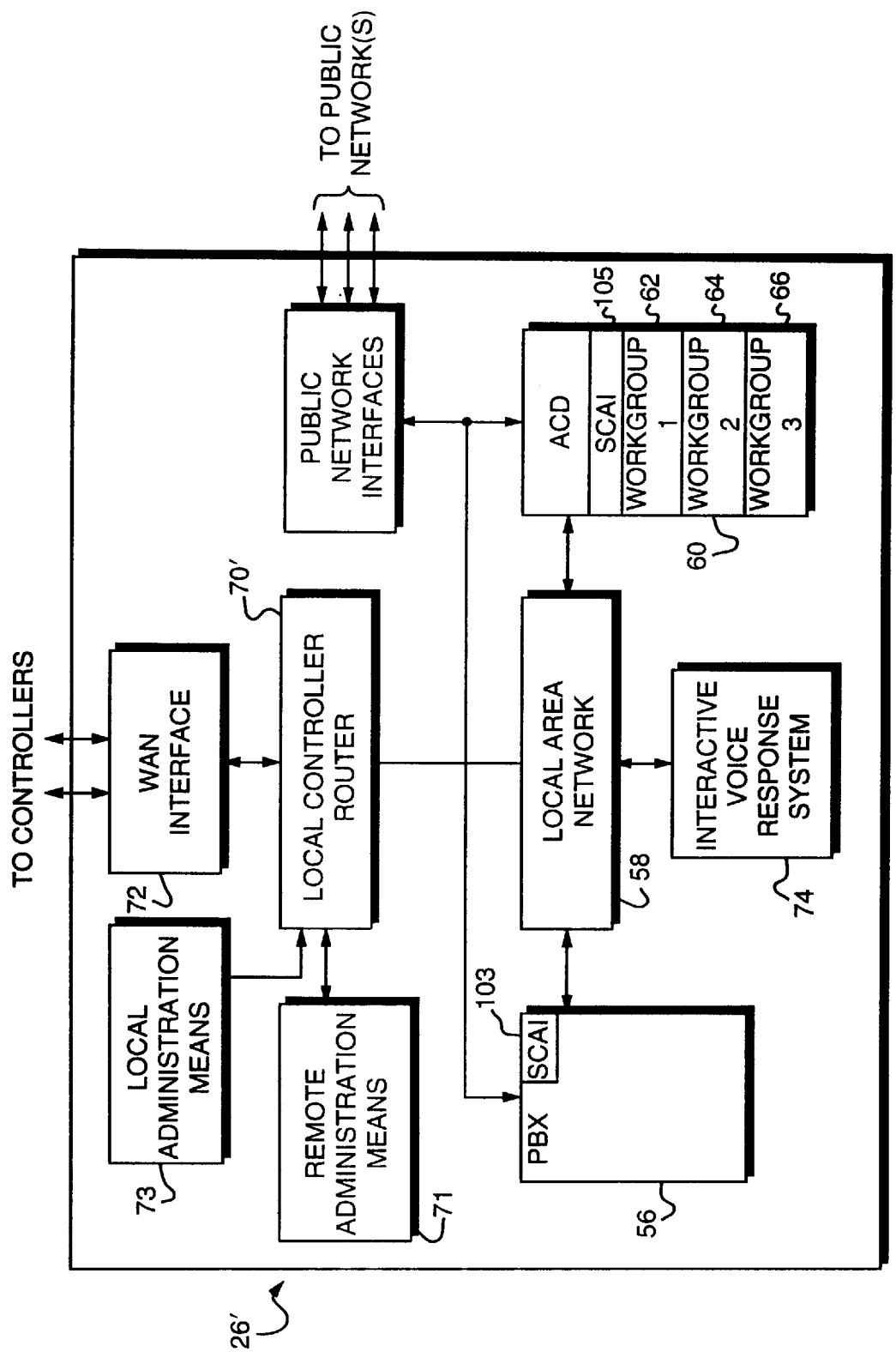
FIG. 8 is a functional block diagram of an agent system of the preferred embodiment of FIG. 5.

FIG. 8 is a functional block diagram of an agent system 26' according to this embodiment 200 of the system of the instant invention. Its elements and operation are essentially the same as those of agent system 26 of the first embodiment 10. Additionally, however, agent system 26' includes connections from WAN interface 72 to the two controllers 30A, 30B, respectively. Also, to accommodate the differences in operation of the system 200 that result from use of a redundant central controller, the local controller 70' is adapted to act on control signals transmitted via the active link from the central controller.

Figure 9:
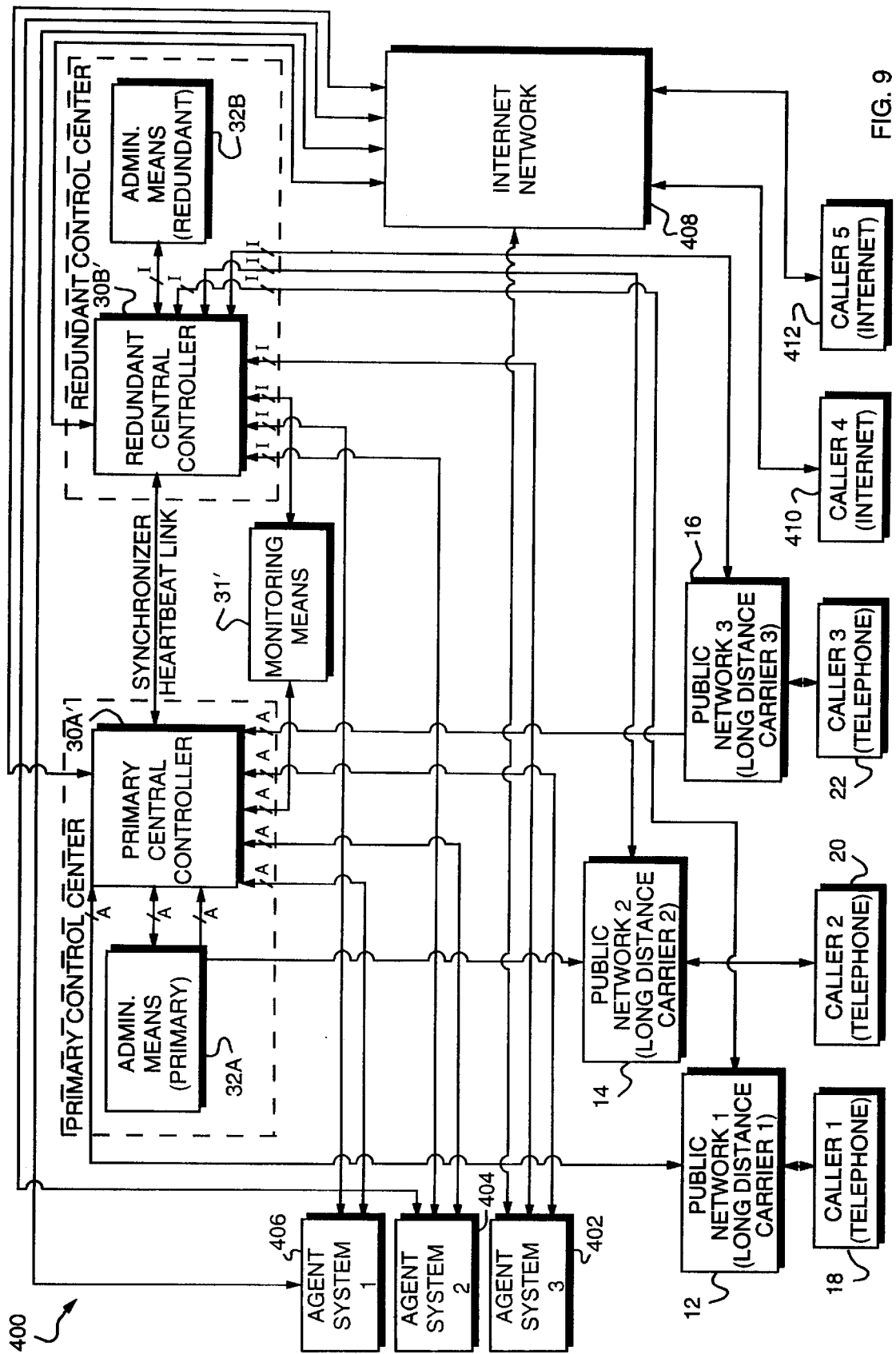
FIG. 9 is a functional level block diagram of a third preferred embodiment of the present invention, in which figure the interconnection lines between the public networks and agent systems have been omitted, but should be understood to exist nonetheless.

FIG. 9 is an architectural-level block diagram of a third preferred embodiment 400 of the present invention. Unless otherwise specifically stated to the contrary, the functional components and operation of the system 400 are substantially similar to those of system 200. System 400 includes at least one agent system 402, and preferably a plurality of agent systems 402, 404, 406 connected to a primary central controller 30A' and redundant central controller 30B', at least one 12, and preferably a plurality of conventional public telephone and/or long distance carrier networks 12, 14, 16, and an Internet network 408. Telephone callers 18, 20, 22 place telephone calls to the agent systems 402, 404, 406 via telephone networks 12, 14, 16, respectively, which although not explicitly shown in FIG. 9, should be understood as being connected to agent systems 402, 404, 406. Internet callers 410, 412 place Internet calls to the agent systems 402, 404, 406 via Internet network 408. The central controllers 30A', 30B' are connected to monitoring means 31'. Central controllers 30A', 30B' operate, and optimally control operation of networks 12, 14, 16, and agent systems 402, 404, 406, in a substantially similar manner to that of controllers 30A and 30B. Additionally, the central controllers also control the individual Internet servers (not shown) comprised within the Internet 408 to optimally route Internet calls through the Internet 408 to the agent systems 402, 404, 406, in a manner that is functionally substantially similar to that used by the central controllers to optimally route telephone calls through the networks 12, 14, 1 6 to the agent systems 402, 404, 406.

Figure 10:
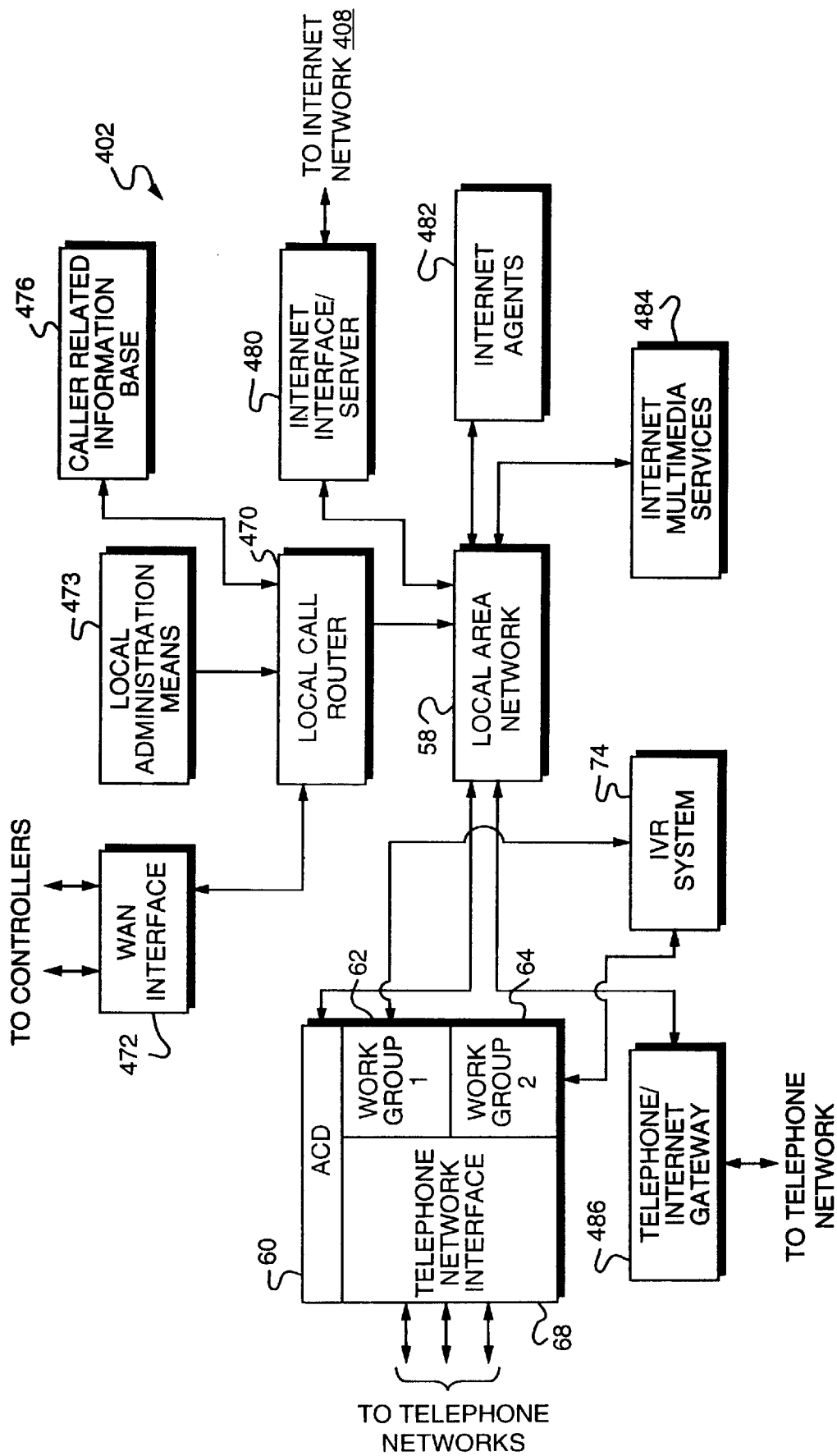
FIG. 10 is a functional block diagram of an agent system of the preferred embodiment of FIG. 9.

FIG. 10 is a functional block diagram of an agent system 402 according to this embodiment 400 of the present invention. Its elements and operation are substantially similar to those of agent system 26' of embodiment 200. Additionally, however, WAN interface 472 passes routing control signals from the central controller to the local telephone call router 470. Router 470 controls routing to and through the workgroups 62, 64 of the ACD 60 and/or IVR system 74 of telephone calls connected to the network interface 68 via the networks 12, 14, 16, based upon the control signals received from the central controller. Router 470 controls routing to and through the Internet agents 482 and/or multimedia services 484 (e.g., text, audio, graphical, and/or video information stored on a conventional system adapted for permitting such information to be transmitted via the Internet network to the Internet callers) of Internet calls connected to the Internet server 480 via the Internet network 408, based upon the control signals received from the central controller. Preferably, the server 480 comprises a conventional Internet packet switch. Preferably, the type of multimedia information supplied from the server 484 to the Internet callers is based upon control signals supplied thereto by the active central controller generated based upon service requests from the Internet callers. Such information may be related to the type of service requested by the Internet caller, product or transaction information, the caller's customer accounts, if any, etc.

Agent system 402 also comprises a database of caller-related information 476 (e.g., previous caller transactions, profile, and/or account information indexed by caller-identifying information, such as caller telephone number, Internet address, and the like). Preferably, the active central controller is adapted to generate control signals for causing specific caller information (i.e., information specifically related to the caller being connected to the agent system) to be automatically transmitted from the database 476 to the individual agent or agents 62, 64, and 482 to be connected to the call based upon caller-identifying information received from the call (e.g., telephone number, customer account number, Internet address, etc.), so as to permit the individual agent to be better able to handle the call. The active central controller may be adapted to cause the system 400 to prompt the caller to supply such caller-identifying information. Likewise, updated information received from the call by the individual agents may be transmitted from the agents and stored in the database 476 for later recall.

Agent system 402 also comprises telephony/Internet interface means 486 for permitting remote telephone and/or Internet-based access to the agent system 402. In other words, a remote individual agent (e.g., home-based "dial-up" or ISDN agent, not shown) may be connected to the local area network 58 of agent system 402 via the interface 486 and the networks 12, 14, 16, 408, whereby to permit the remote agent to act as a "virtual" agent within the agent system. Alternatively, calls from the Internet network 408 may be routed via Internet telephone gateway 486 and interface 68 into the ACD 60.

Figure 11:
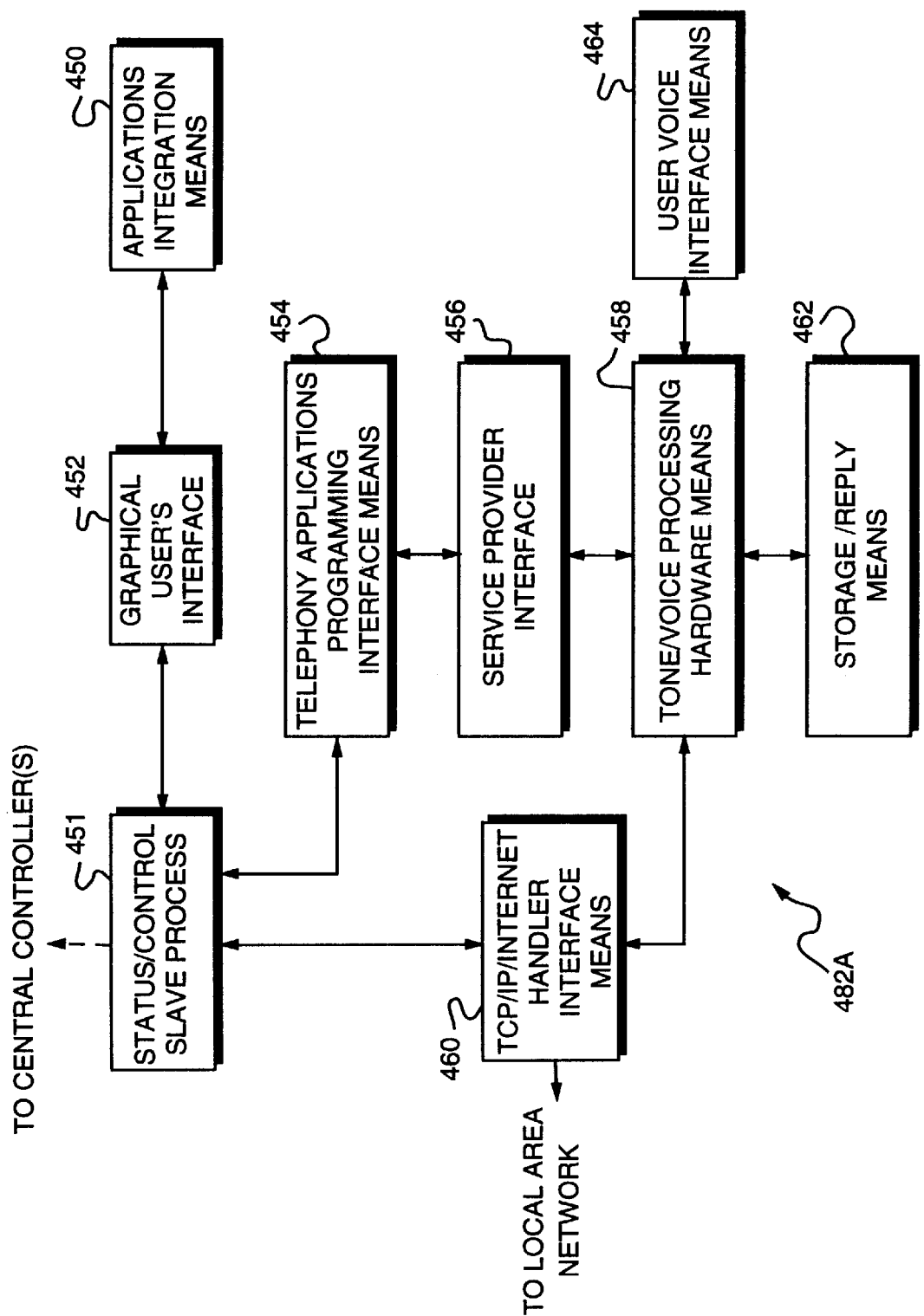
FIG. 11 is a functional block diagram of an individual agent workstation of the agent system of FIG. 10.

Preferably, in this embodiment 400, the Internet agents 482 and telephone workgroups 62, 64 comprise at least one 482A individual agent computer/telephonic workstation having the construction shown in FIG. 11. Workstation 482A comprises means 460 for interfacing tone/voice processing means 458 to the local area network 58. Preferably, means 460 comprises a TCP/IP and/or Internet handler interface means and permits the processing means 458 to be able to exchange voice, Internet packet, tonal, facsimile, and/or other types of data between the callers and the user (not shown) of the agent workstation 482A. It is important to note in this regard that processing means 458 is also adapted to permit exchange of voice data via the Internet network between the Internet callers 410, 412 and the user of the workstation (via, e.g., Voice Over Internet™ software protocol by Microsoft). Voice processor 458 also includes means for compressing and decompressing voice data transmitted and received by said processor 458.

Processing means 458 receives recorded verbal instructions and/or greetings from the storage means 462 and transmits same to the caller when the caller is initially connected to the workstation 482A. Such verbal information may be stored in the storage means 462 via user voice interface 464, which interface 464 also permits the user of the workstation to be able to verbally communicate with callers placing voice calls over the networks 12, 14, 16 and 408. The storage means 462 may also be adapted to supply a voice message to the interface means 464 upon connection of the call to the workstation indicative of the type of service being requested by the caller based upon caller-identifying information supplied by the call.

Various functional components of workstation 482A are controlled by the user of the workstation 482A by a graphical user interface means 452 which transmits appropriate control signals to the means 458 via status/control slave process 451, conventional telephony applications programming interface means 454 and service provider interface 456, to the means 460, and to the integration means 450. Means 452 also permits the user of the workstation to request that the central controller forward the call connected to the workstation to another node of the system 400 (e.g., another agent workstation, Internet address, telephone number, IVR, etc.), and to request that the central controller connect the workstation to a requested caller via any one of the networks 12, 14, 16, 408. Interface means 452 also permits the user of the workstation to view, edit, and update information stored and retrieved from the database 476, and to merge that data via integration means (which utilizes conventional object linking and embedding, and dynamic data exchange technology) into conventional word-processing and/or other data processing computer applications (not shown) whereby to permit further processing of said data via such applications. The interface 452 also permits the user of the workstation to request that the active central controller change the call availability status of the workstation to permit the workstation to place an outgoing call, although it is important to note that the control and service request functions permitted by the graphical interface 452 are subject to the control of the active central controller. In other words, although the workstation may request that its call availability status be changed, unless permitted by the active central controller, the user workstation may not change the availability of the workstation to receive an outside call.

Of course, it should be understood that if appropriately modified, the slave process 451 could be adapted to communicate directly with the central controller via one or more public, private, or wide area networks, so as to permit the central controller to be able to control the agent workstation directly (i.e., without having to go through the agent system), as shown in ghost in FIG. 11. In such a modification, the slave process 451 may be connected to means (not shown in FIG. 11) for providing a multiplexing interface of the workstation 482A and other components of the system 400 (i.e., other workstations) to the central controller for gathering status messages, connection requests, etc. from the workstation 482A and/or other component and transmitting them to the central controller, and for transmitting control signals from the central controller to the workstation 482A and/or other components connected to the multiplexing interface means.

Figure 12:
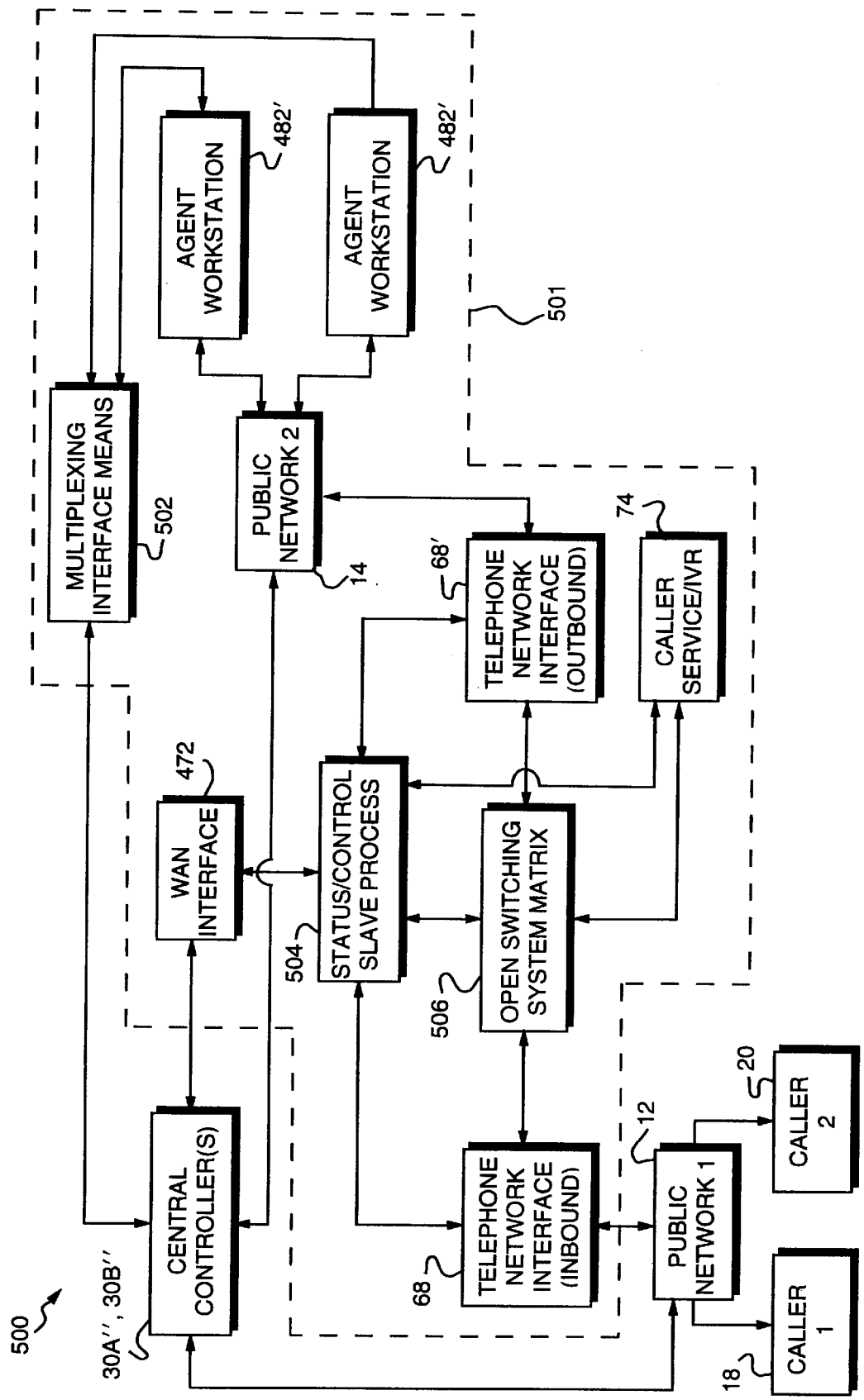
FIG. 12 is a functional block diagram of a fourth preferred embodiment of the present invention.

A fourth preferred embodiment 500 of the present invention is shown in FIG. 12. Unless specifically stated to the contrary, it should be understood that that functional components of embodiment 500 in common with those of embodiment 200 operate in substantially the same way as those of embodiment 200. It should also be noted that although not specifically shown in FIG. 12, embodiment 500 comprises monitoring and administrative means that are substantially similar to those in embodiment 200. The central controllers 30A", 30B" utilize status messages from the network 12 and virtual caller service center 501, service requests from the callers 18, 20 placing voice calls to the system 500, and optimization parameters to generate control signals for controlling the network 12 and service center 501 so as to optimally route the calls therethrough to the call service/IVR 74 and/or agent workstations 482' (whose preferred construction will be described more fully below). Caller service center 501 includes WAN interface means 472 for interfacing status/control process means 504 to central controllers 30A", 30B". Slave process 504 transmits control signals to the telephony interfaces 68, 68', conventional open switching matrix 506, and caller service/IVR system based upon control signals received from the central controllers, and also gathers and transmits status messages from these components to the central controllers via the WAN interface. In this embodiment 500, agents 482' are connected to the switching matrix 506 via telephony interface means 68' and public network 14, which are controlled by the central controllers. Voice agent stations 482' receive control signals from and transmit status messages to the central controllers via the multiplexing interface means 502 (the operation of which has been described previously). It should be understood that although they are shown as being separate networks in FIG. 12, networks 12, 14 may comprise the same physical network in this embodiment 500. Advantageously, in this embodiment, substantially all of the call routing "intelligence" resides in the central controllers rather than various other system components (e.g., PBX's, ACD's, etc.). Thus, by appropriately modifying the programming of the central controllers, the central controllers may be used to optimally control many different types of call routing and/or switching hardware without requiring substantial modification and/or adaptation of those components.

Figure 13:
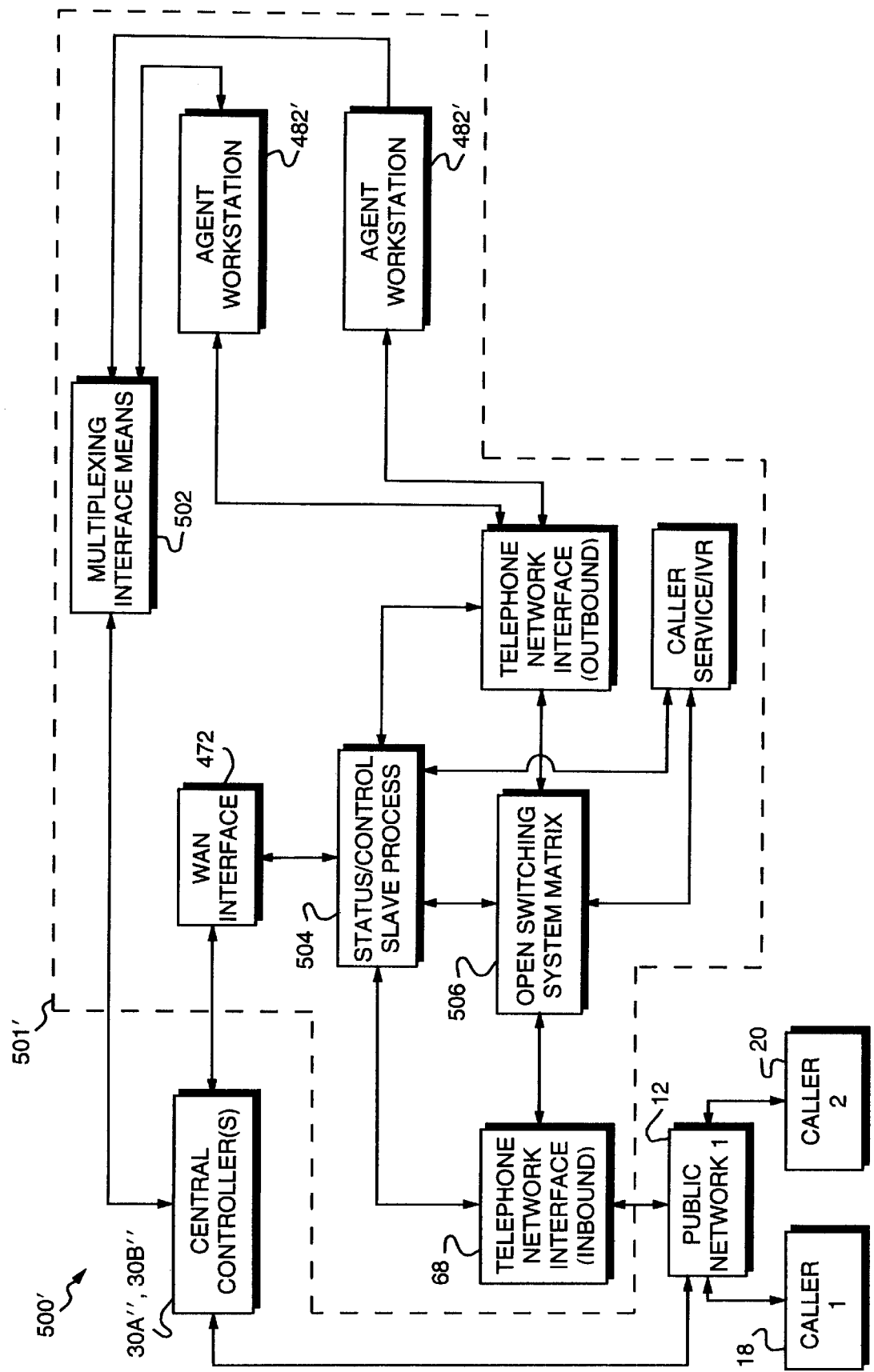
FIG. 13 is a functional block diagram of a variation of the fourth preferred embodiment shown in FIG. 12.

FIG. 13 is a variation 500' of the system 500 of FIG. 12, and unless specifically stated to the contrary, the operation and functional components of embodiment 500' should be understood to be substantially the same as those of embodiment 500. Substantially the only difference between embodiments 500 and 500' is that network 14 is omitted from the caller servicer 501' of embodiment 500'. As a result of this difference, interface means 68' in embodiment 500' is adapted to permit means 68' to optimally route calls directly to appropriate ones of the agent workstations 482' based upon control signals generated by the central controllers.

Figure 15:
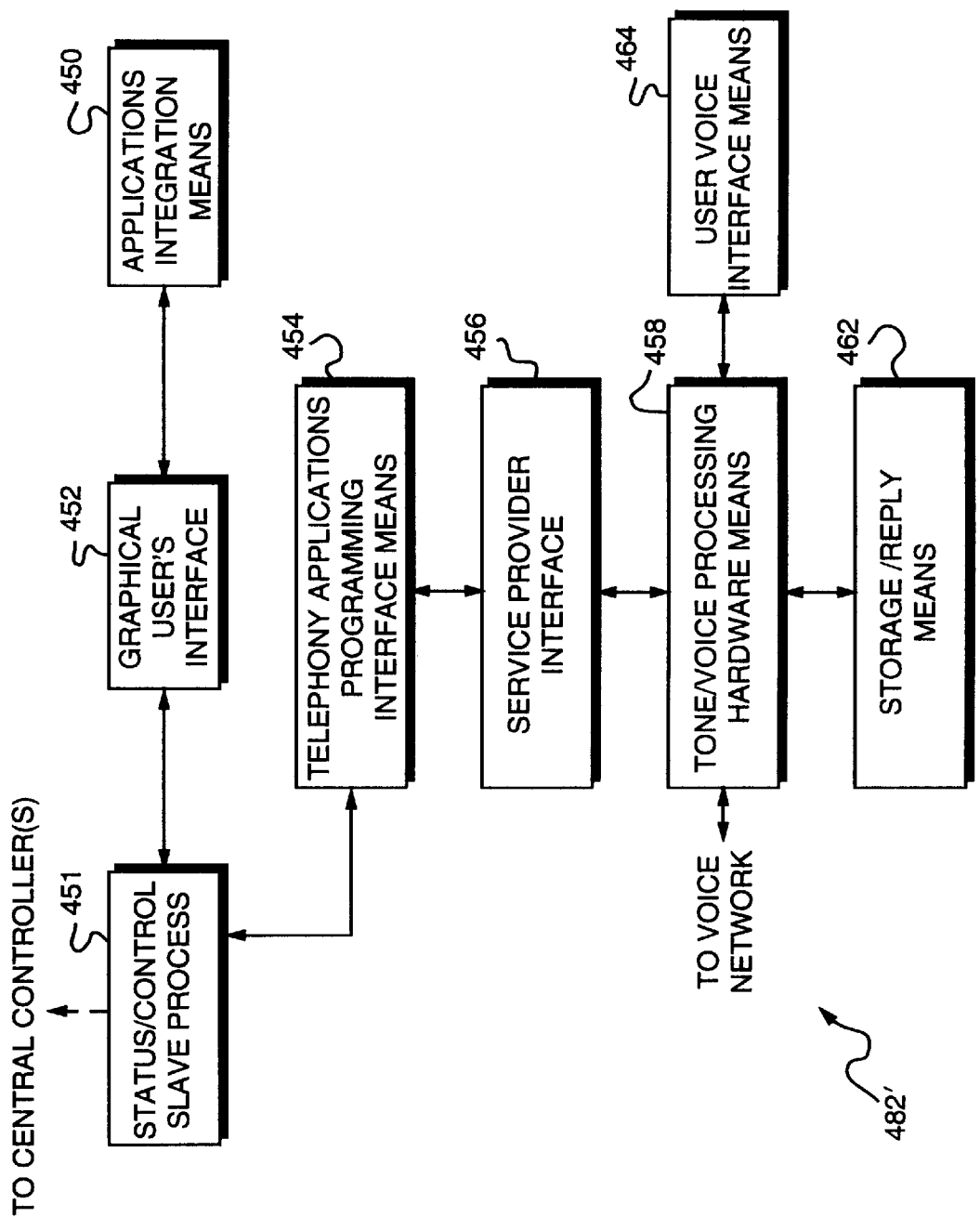
FIG. 15 is a functional block diagram of a variation of the individual agent workstation of FIG. 11.

FIG. 15 shown the functional components of a preferred construction of the voice agent workstations 482' shown in FIGS. 12 and 13. Unless otherwise specifically indicated to the contrary, it should be understood that the functional components and operation of workstation 482 are substantially the same as those of workstation 482A. In workstation 482', however, the voice processing means 458 is connected directly to the either the public network 14 or to the interface means 68', and the voice processing means 458 is adapted to interact directly with these components, and to permit exchange of voice communication directly with callers via these components.

Figure 14:
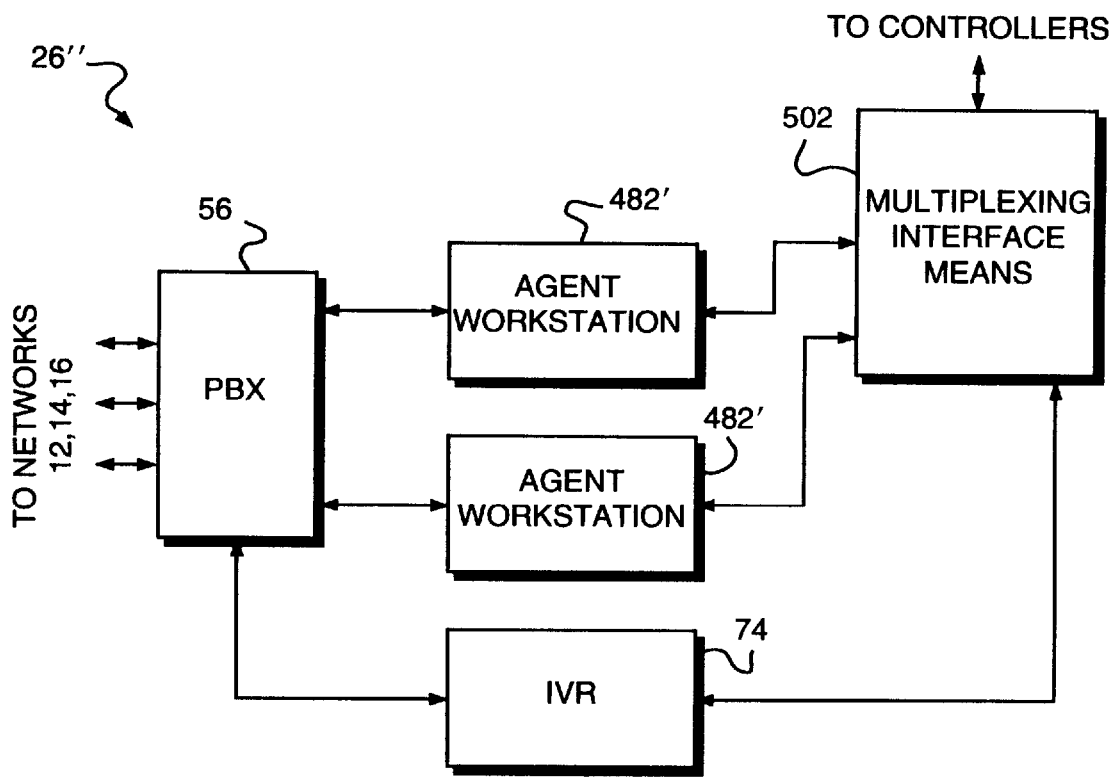
FIG. 14 is a functional block diagram of a variation of the agent system shown in FIG. 8.

FIG. 14 illustrates a variation 26" of the agent system 26' shown in FIG. 8. In agent system 26", the PBX 56 is adapted to be interfaced directly with the telephone networks 12, 14, 16. PBX 56 is adapted to forward all calls received from the networks 12, 14, 16 to the IVR 74 which is controlled directly by the central controllers via control signals received therefrom via the interface means 502. Control signals transmitted from the central controllers cause the IVR 74 to optimally route and queue calls from the networks 12, 14, 16 to the agent workstations 482'. Additionally, status messages from the workstations 482' and IVR 74 are transmitted to and control signals received from the central controllers via interface means 502.

Thus, it is evident that there has been provided a communications systems and method for operating same that fully satisfy both the aims and objectives hereinbefore set forth. It will be appreciated that although specific embodiments and methods of use have been presented, many modifications, alternatives and equivalents will be apparent to those skilled in the art. For example, preferably, the above-presented functional components (with the exception of the networks 12, 14, 16, 408) of the preferred embodiments of the system of the present invention are embodied as one or more distributed computer program processes running on one or more conventional general purpose computers networked together by conventional computer networking means. Most preferably, each of these functional components is embodied by running distributed computer program processes on IBM-type, Intel 80486, Pentium™ or RISC microprocessor-based personal computers networked together by conventional networking means and including such additional conventional computer and telephonic communications hardware (e.g. modems) and software as is appropriate to enable performance of the stated function. Also, preferably, these personal computers run the Microsoft Windows™, Windows NT™, Windows 95™, or DOS™ operating systems. However, the various functional components of the embodiments of the system of the present invention may alternatively be constructed solely out of custom, dedicated electronic hardware and software, without departing from the present invention. Further alternatively, rather than use IBM-type PC's, the system may instead utilize SUN™ and/or conventional RISC-based workstations.

Many other modifications are also possible. For example, although the monitoring means 31, 31' of the preferred embodiments 10, 200, 400, of the system of the present invention may be thought of in a functional sense as comprising a single, centralized process, it may also comprise a plurality of distributed computer processes (not shown), at least one of which is located at each agent system 24, 26, 28, 24', 26', 28', 402, 404, 406, central controller 30, 30A, 30B, 30A', 30B' and administration means 32, 32A, 32B for monitoring the functioning of the functional components of the embodiments 10, 200, 400. In either case, the monitoring means monitors proper functioning of the components of the system by systematically receiving from the components status messages via monitor repeaters or distributors (similar in function to the distributor means 77) which copy the messages and distribute them to the monitoring means. The functional components intended to be monitored by the monitoring means are programmed to generate periodic status messages which are gathered by the monitor distributors and transmitted to the monitoring means. The monitoring means then may determine if the system behavior is within bounds and notify attendant personnel and/or initiate diagnostics on the failed system.

Further alternatively, although the agent systems 26, 26' shown in FIGS. 3 and 8 utilize a local controller 70 or 71' to control distribution of calls within individual PBX 56 and ACD 60, if PBX 56 and/or ACD 60 are equipped with conventional Switch to Computer Applications Interface (SCAI) means 103 and 105, the central controller 30, 30A may be used to directly control distribution of calls within the systems so equipped. In such an agent system, when a call is to be routed in a PBX 56 or ACD 60 equipped with SCAI means, the central controller transmits appropriate control signals for controlling a system equipped with SCAI means to the local controller 70, 70' which has been modified to permit transmission of these signals directly to the local area network 58 to the SCAI means of the PBX or ACD to be controlled. The PBX or ACD equipped with SCAI means may thus be controlled essentially directly by the primary central controller. It will be appreciated that although SCAI means 103, 105 are shown in FIGS. 3 and 8, means 103, 105 may instead be of any industry standard proprietary type, or may be adapted to utilize some other type of conventional industry standard control protocol.

Other modifications are also possible. For example, although the foregoing description has proceeded upon the assumption that calls are routed from outside the public networks to the agent systems, if appropriately modified in ways apparent to those skilled in the art, the system may also permit and control routing of calls from the agent systems through the public network to outside call receivers.

Additionally, although in the preferred embodiments of the system of the present invention, only the central controller is made redundant, other functional elements may also be made redundant by modifying them in ways apparent to those skilled in the art and/or utilizing the fault-tolerance principles discussed above. Advantageously, this permits even greater system-wide fault-tolerance to be obtained.

Further alternatively, the various functional components of the embodiments 10, 200, 400 may be programmed or otherwise adapted to permit third party intra-system call routing or forwarding. For example, in the event that a workgroup to which a caller wishes to be connected by the system is busy or otherwise unable to accept the call at the time requested, the central controller may be programmed to forward the call to an interactive voice response (IVR) system or other such node appropriately provisioned (within the agent system or stand-alone), and to record appropriate data to enable the central controller to later connect the IVR to the workgroup to which connection was initially desired. The IVR may then prompt the caller to furnish appropriate information for later processing of the call (e.g. purpose of call, caller's name, telephone number, etc.). When the workgroup becomes available, the central controller connects the IVR to the workgroup, and commands the IVR to transmit the information stored from the caller to the workgroup via the public network. The members of the workgroup may then undertake further action, such as placing a call to the caller.

Alternatively, upon notifying the caller that the workgroup is busy, the central controller or IVR may prompt the user to indicate whether the caller wishes to be called back by the workgroup. If the caller indicates that such is desirable, the central controller may record this and other information useful for later processing of the call, and terminate the call. Once the workgroup again becomes available, the central controller may then telephone the caller through the public network, prompt the caller when the caller wishes to be connected to the workgroup, and connect the caller to the workgroup.

Additionally, if appropriately modified at least one of the public networks may be replaced by a private network suitable for being controlled by the central controller.

In yet another modification, the system may be adapted to permit so-called "translation routing" using a conventional DNIS-number routing scheme. In such an appropriately modified system, the system directs the public interexchange carrier to route the call to a specific agent system using a specific DNIS number. When that call arrives at the agent system, the local router is adapted to direct the connection of the call to the desired service. As will be appreciated, the desired service may have been selected by the caller entering an account number, personal ID number or other type of direction information in response to a network-generated caller prompt.

Further alternatively, the system may be adapted to permit caller and/or workgroup call routing and/or forwarding by permitting the caller and/or workgroup to enter a desired termination extension and then optimally routing the call to that extension. The active central controller may also be adapted to generate appropriate control signals for controlling at least one node (e.g., network 12, 14, 16, agent system, IVR, workstation, caller service, etc.) of the system to hold a call thereat before connection of the call to its ultimate destination. While the call is being held at the node, the central controller may cause the node (if the node is capable of this function) to prompt the caller to supply information for facilitating further processing of the call in the system. Alternatively, the central controller may cause another to be conferenced with the call while the call is being held at the node, or to prompt the caller to record a voice message if the node comprises a voice response unit. Also, if the node is appropriately provisioned for same, the central controller may cause the node to supply music to the call while the call is being queued at the node. Advantageously, such call queuing in the system may permit call routing and/or forwarding to anywhere in the system.

Other modifications are also possible. For example, in embodiment 400, if the central controllers and agent systems are adapted in ways apparent to those skilled in the art, the local router of the agent systems may be eliminated, and the central controllers may control directly the workgroups, workstations, IVR systems, and multimedia services of the agent systems. Furthermore, if appropriately modified, the Internet and telephone agent workgroups may comprise separate, geographically remote, agent systems.

In yet another modification, the system of the present invention may include Advanced Intelligent Network (AIN) platform means (e.g., comprised within the telephone networks) for requesting an alternate termination (e.g., a remote agent or caller service) from the central controller in response to an AIN trigger from an original termination (e.g., a nearby agent system or caller service) requested by the caller. In such modification, the system includes at least one network switch for being controlled by the central controller to connect the call to the alternate termination.

Accordingly, the present invention is intended to cover all such alternatives, modifications, and equivalents as may be included within the spirit and broad scope of the invention as defined only by the hereafter appended claims.

Thus, advantageously, the present invention permits automatic telephone routing decisions to be made with "global authority" based upon information gathered in real time from the entire communications system. The present invention permits unified central control and management for the entire system. The present invention also uses a distributed client/server network structure that enables efficient use and transmission of system data, as well as fault tolerance through replicated system functions. A system-wide distributed diagnostic monitoring and servicing network permits reaction to and recovery from system component failure in real time. None of these features of the present invention are disclosed anywhere in the prior art.

We claim:

1. A communications system, comprising at least one Internet network for interconnecting an Internet call and at least one agent system, said agent system including a plurality of workgroups, and a primary central controller for generating control signals to control said network and said agent system to optimally route and interconnect said call between said network and one workgroup of said agent system, said central controller being for generating said control signals based upon status messages received from said agent system, requested service data from said network, and optimization parameters, said communications system further comprising a database of caller-related information for being interfaced with said at least one agent system whereby to permit data exchange between said database and said at least one agent system.

2. A communications system according to claim 1, and further comprising, a local area network for interfacing said database with said at least one agent system.

3. A communications system according to claim 1, wherein said central controller is also for generating control signals for controlling said data exchange between said at least one agent system and said database.

4. A communications system according to claim 1, wherein said workgroups comprise a plurality of individual computer workstations connected together and to said database of caller-related information via a local area network for permitting data exchange among said workstations and said database.

5. A communications system according to claim 1, wherein said database includes transaction-related information associated with a caller placing said call.

6. A communications system according to claim 1, wherein said data exchange includes transmission of stored caller-related information from said database to said at least one agent system and transmission of updated caller-related information to said database from said at least one agent system.

7. A communications system according to claim 1, wherein said central controller is also for generating control signals for causing said communications system to prompt a caller placing said call for caller-identifying information, for causing said call to be interconnected to said one workgroup based upon said caller-identifying information, and for causing said database to transmit to said one workgroup said caller-related information based upon said caller-identifying information.

8. A communications system, comprising at least one Internet network for interconnecting an Internet call and at least one agent system, said agent system including a plurality of workgroups, and a primary central controller for generating control signals to control said network and said agent system to optimally route and interconnect said call between said network and one workgroup of said agent system, said central controller being for generating said control signals based upon status messages received from said agent system, requested service data from said network, and optimization parameters, wherein said at least one agent system includes a computer workstation for providing to a user of said workstation an indication of status of said call.

9. A communications system according to claim 8, wherein said computer workstation is for being connected to said call, and said workstation includes a graphical user interface for permitting a user of said workstation to control, at least in part, processing of said call in said communications system and for displaying specific called-related information obtained from a database containing said information.

10. A communications system according to claim 8, wherein said at least one agent system includes individual agent workstations and means for indicating to said central controller availability of said individual workstations to be connected to said call.

11. A communications system according to claim 10, wherein said indicating means includes means for preventing said agent workstations from changing their availability status.

12. A communications system according to claim 8, wherein said workstation is for transmitting to said user of said workstation a voice message in response to connection of said call to said one workgroup.

13. A communications system, comprising at least one Internet network for interconnecting an Internet call and at least one agent system, said agent system including a plurality of workgroups, and a primary central controller for generating control signals to control said network and said agent system to optimally route and interconnect said call between said network and one workgroup of said agent system, said central controller being for generating said control signals based upon status messages received from said agent system, requested service data from said network, and optimization parameters, so as to permit a caller placing said call to make a voiceless transaction with said at least one agent system via said call.

14. A communications system, comprising at least one Internet network for interconnecting an Internet call and at least one agent system, said agent system including a plurality of workgroups, and a primary central controller for generating control signals to control said network and said agent system to optimally route and interconnect said call between said network and one workgroup of said agent system, said central controller being for generating said control signals based upon status messages received from said agent system, requested service data from said network, and optimization parameters, wherein said central controller is also for controlling at least one node in said communications system so as to queue said call at said at least one node for further processing.

15. A communications system according to claim 14, wherein said at least one node includes a caller service.

16. A communications system according to claim 15, wherein said caller service includes a voice response unit, and said central controller is also for causing said voice response unit to prompt a caller placing said call to record a voice message in said voice response unit.

17. A communications system according to claim 14, wherein said at least one node includes said at least one agent system.

18. A communications system according to claim 14, wherein said at least one node includes said at least one network.

19. A communications system according to claim 14, wherein said central controller is also for causing a caller placing said call to be prompted to provide information while said call is being held at said at least one node.

20. A communications system according to claim 14, wherein said central controller is also for controlling said at least one node so as to conference said call with at least one other call.

21. A communications system according to claim 14, wherein said central controller is also for causing said communications system to supply music to said call while said call is being held at said node.

22. A communications system, comprising at least one Internet network for interconnecting an Internet call and at least one Internet agent system, said agent system including a plurality of workgroups, and a primary central controller for generating control signals to control said network and said agent system to optimally route said call between said network and one workgroup of said agent system, said controller being for generating said control signals based upon status messages received from said agent system, requested service data from said network, and optimization parameters stored at said central controller.

23. A communications system according to claim 22, wherein said at least one agent system includes an Internet server and at least one individual agent workstation connected together via a data exchange network.

24. A communications system according to claim 23, wherein said least one agent system also includes means for interfacing said at least one agent system to at least one telephone network so as to permit a telephone call made via said telephone network to be connected to said at least one agent system.

25. A communications system according to claim 24, wherein said telephone call includes a facsimile call and at least one agent system includes at least one agent workstation adapted for facsimile communication with said facsimile call.

26. A communications system according to claim 23, wherein said data exchange network includes said Internet network and at least one of said workgroups comprises an agent workstation connected to said server via said Internet network.

27. A communications system according to claim 23, wherein said data exchange network includes a local area network connecting said workgroups to said server.

28. A communications system according to claim 23, wherein at least one of said workgroups comprises an agent workstation for exchanging voice communication data with a caller placing said call via said Internet network.

29. A communications system according to claim 28, wherein said at least one agent system also includes means for interfacing said at least one agent system to at least one telephone network so as to permit a voice telephone call made via said telephone network to be connected to said at least one agent system, and said agent workstation is also adapted for voice communication with said voice call.

30. A communications system according to claim 22, and further comprising, at least one Internet service provider for being connected via said Internet network to said call so as to provide information of at least one type to a caller placing said call, and said central controller is also for supplying control signals to said service provider to control interconnection of said service provider and said call and the at least one type of information provided to said caller based upon said requested service data and status messages supplied to said central controller from said service provider.

31. A communications system according to claim 30, wherein said multi-media service provider includes at least one Internet multimedia service provider.

32. A communications system according to claim 30, wherein said at least one type of information is selected from the group consisting of: graphical, video, textual, and audio information.

33. A communications system according to claim 30, wherein said central controller is also for generating control signals in response to status messages from said at least one agent system and said requested service data for causing said call to be disconnected from said service provider and to be connected to said at least one agent system.

34. A communications system according to claim 30, wherein said central controller is also for generating control signals in response to status messages from said service provider and requested service data for causing said call to be disconnected from said at least one agent system and to be connected to said service provider.

35. A communications system, and comprising, at least one telephone network for interconnecting at least one telephone call to at least one telephone call service, at least one Internet network for connecting an Internet call to at least one Internet call service, said call services and said telephone network being controlled by control signals supplied thereto from a primary central controller for generating said control signals so as to optimally route said telephone call between said telephone network and said telephone call service, and also so as to optimally connect said Internet call and said Internet call service, based upon status messages received from said call services, requested service data from said networks, and optimization parameters.

36. A communications system according to claim 35, wherein said call services comprise at least one telephone agent system, at least one Internet agent system, and at least one Internet multimedia service provider.

37. A communications system according to claim 35, wherein said call services are connected together via said Internet network and a telephone network/Internet network switching interface.

38. A communications system according to claim 35, wherein said caller services comprise at least one agent system including at least one agent workstation including voice processing means for permitting a user of said workstation to be able to verbally communicate with telephone and Internet callers placing said calls via said networks.

39. A communications system according to claim 38, wherein said voice processing means includes voice data compression/decompression means.

40. A communications system, comprising at least one Internet network for interconnecting an Internet call and at least one agent system, said agent system including a plurality of workgroups, and a primary central controller for generating control signals to control said network and said agent system to optimally route and interconnect said call between said network and one workgroup of said agent system, said central controller being for generating said control signals based upon status messages received from said agent system, requested service data from said network, and optimization parameters, said communications system also comprising, an Advanced Intelligent Network (AIN) Platform for requesting an alternate termination from said central controller in response to an AIN trigger from an original termination requested by said call.

41. A communications system according to claim 40, wherein said system further includes at least one network switch for being controlled by said central controller to connect said call to said alternate termination.

42. A communications system, comprising at least one Internet network for interconnecting an Internet call and at least one agent system, said agent system including a plurality of workgroups, and a primary central controller for generating control signals to control said network and said agent system to optimally route and interconnect said call between said network and one workgroup of said agent system, said central controller being for generating said control signals based upon status messages received from said agent system, requested service data from said network, and optimization parameters, wherein said agent system includes at least one private branch exchange (PBX) for being controlled by said central controller to connect said call to an individual agent.

43. A communications system according to claim 42, wherein said PBX is also for being controlled by said central controller to connect said call to an interactive voice response (IVR).

44. A communications system according to claim 43, wherein said IVR is adapted to receive from, transmit to, and process multiple calls from said PBX.

45. A communications system according to claim 42, wherein said agent system also includes an interactive voice response (IVR) and said PBX is also for transferring said call between said individual agent and said IVR.

46. A controller for use in a communications system, said communications system including at least one Internet network for interconnecting an Internet caller and at least one agent in an agent system, said controller comprising a control signal generator for generating control signals for controlling said network and said agent system so as to optimally route interconnection of said caller and said at least one agent through said network and agent system, said control signal generator being for generating said control signals based upon status messages from said agent system, requested service data from said network, and optimization parameters.

47. A controller according to claim 46, wherein said communications system comprises one network selected from the group consisting of: a wide area network, a local area network, a telephone network, a private network, and a public network.

48. A controller for use in controlling a communications system, said communications system including at least one Internet network for interconnecting an Internet caller and at least one caller service, said controller comprising a control signal generator for generating control signals for controlling said network and said at least one caller service so as to optimally route interconnection of said caller and said at least one caller service through said network, said control signal generator being for generating said control signals based upon information from said at least one caller service, requested service data from said network, and optimization parameters.

49. A controller according to claim 48, wherein said communications system comprises one network selected from the group consisting of: a wide area network, a local area network, a telephone network, a private network, and a public network.

50. A controller for use in controlling a communications system, said communications system including at least one Internet network for interconnecting an Internet caller and at least one private branch exchange, said controller comprising a control signal generator for generating control signals for controlling said network and said at least one private branch exchange so as to optimally route interconnection of said caller and said at least one private branch exchange through said network, said control signal generator being for generating said control signals based upon information from said at least one private branch exchange, requested service data from said network, and optimization parameters.

51. A controller according to claim 50, wherein said communications system comprises one network selected from the group consisting of: a wide area network, a local area network, a telephone network, a private network, and a public network.

* * * * *